United States Patent
Magin et al.

(10) Patent No.: US 9,280,405 B2
(45) Date of Patent: Mar. 8, 2016

(54) ERROR CORRECTION FOR POWERLINE COMMUNICATION MODEM INTERFACE

(71) Applicant: QUALCOMM Incorporated, San Diego, CA (US)

(72) Inventors: Gregory Allen Magin, Ocala, FL (US); Celestino Anastasio Corral, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 13/841,997

(22) Filed: Mar. 15, 2013

(65) Prior Publication Data

US 2014/0129892 A1 May 8, 2014

Related U.S. Application Data

(60) Provisional application No. 61/723,769, filed on Nov. 7, 2012.

(51) Int. Cl.
G06F 11/00 (2006.01)
G06F 11/30 (2006.01)
(Continued)

(52) U.S. Cl.
CPC ............ *G06F 11/0706* (2013.01); *H04B 3/542* (2013.01); *H04B 3/56* (2013.01); *H04B 2203/542* (2013.01); *H04B 2203/5491* (2013.01)

(58) Field of Classification Search
CPC ...... H02M 1/42; G06F 11/0706; H04L 1/004; H04L 25/0272; H04L 25/0292; H04L 25/028; H04L 25/08; H04L 7/0008; H04B 3/54; H04B 3/56
See application file for complete search history.

(56) References Cited

U.S. PATENT DOCUMENTS

| 4,683,529 A | 7/1987 | Bucher, II |
| 4,804,938 A * | 2/1989 | Rouse ...................... H02J 3/14 307/11 |

(Continued)

FOREIGN PATENT DOCUMENTS

| DE | 102008009542 B4 | 6/2010 |
| EP | 1361669 | 11/2003 |

(Continued)

OTHER PUBLICATIONS

Co-pending U.S. Appl. No. 13/115,700, filed May 25, 2011.

(Continued)

*Primary Examiner* — Sam Rizk
*Assistant Examiner* — Enamul M Kabir
(74) *Attorney, Agent, or Firm* — DeLizio Law, PLLC

(57) ABSTRACT

A powerline communication (PLC) power supply and modem interface can be implemented using a power supply processing unit coupled with a PLC modem unit. The power supply processing unit generates a composite PLC signal comprising a PLC signal and a DC power signal modulated with a zero cross signal (all determined from an AC powerline signal). High-powered components of the PLC modem unit can cause signal distortion in the zero cross signal component of the composite PLC signal making it difficult to extract zero cross information. An error correction unit can be implemented at the PLC modem unit to minimize the signal distortion and generate a zero cross signal with little or no error. The PLC modem unit also extracts the PLC signal and the DC power signal from the composite PLC signal, and processes the PLC signal using the zero cross information extracted from the corrected zero cross signal.

30 Claims, 10 Drawing Sheets

(51) Int. Cl.
*G08C 25/00* (2006.01)
*H03M 13/00* (2006.01)
*H04L 1/00* (2006.01)
*G06F 11/07* (2006.01)
*H04B 3/54* (2006.01)
*H04B 3/56* (2006.01)

(56) References Cited

U.S. PATENT DOCUMENTS

| | | | |
|---|---|---|---|
| 4,825,350 A | 4/1989 | Brackman, Jr. | |
| 4,864,589 A * | 9/1989 | Endo | H04B 3/542 375/141 |
| 5,619,494 A | 4/1997 | Nishikawa | |
| 6,950,460 B1 * | 9/2005 | Cappelletti | H04B 3/54 375/222 |
| 7,256,638 B2 | 8/2007 | Vice | |
| 8,674,539 B1 | 3/2014 | Magin et al. | |
| 2003/0210734 A1 * | 11/2003 | Kaku | H04B 1/7097 375/148 |
| 2007/0121676 A1 * | 5/2007 | Koga | H04B 3/54 370/482 |
| 2007/0131784 A1 | 6/2007 | Garozzo et al. | |
| 2009/0074044 A1 * | 3/2009 | Yokomitsu | H04B 3/54 375/225 |
| 2009/0310688 A1 | 12/2009 | Ikeda | |
| 2012/0126612 A1 * | 5/2012 | Hurwitz | H04B 3/54 307/3 |

FOREIGN PATENT DOCUMENTS

| | | |
|---|---|---|
| EP | 2090958 A1 | 8/2009 |
| KR | 20060094578 A | 8/2006 |
| KR | 20100135639 A | 12/2010 |
| KR | 20110062559 A | 6/2011 |
| WO | 2012044542 | 4/2012 |
| WO | 2014074693 A1 | 5/2014 |

OTHER PUBLICATIONS

"PCT Application No. PCT/US2011/052996 International Preliminary Report and Written Opinion", Feb. 16, 2012, 15 pages.

"PCT Application No. PCT/US2011/052996 International Preliminary Report on Patentability", Feb. 11, 2013, 6 pages.

"PCT Application No. PCT/US2013/068911 International Search Report and Written Opinion", Feb. 17, 2014, 13 pages.

Garcia, et al., "Mitigation of cyclic short-time noise in indoor power-line channels", Mar. 26, 2007, 5 pages.

* cited by examiner

ERROR CORRECTION FOR POWERLINE COMMUNICATION MODEM INTERFACE

RELATED APPLICATIONS

This application claims the priority benefit of U.S. Provisional Application No. 61/723,769, filed Nov. 7, 2012.

BACKGROUND

Embodiments of the inventive subject matter generally relate to the field of communication systems and, more particularly, to error correction in a powerline communication power supply and modem interface system.

Electric transmission and distribution lines are typically used for providing electric power from generators to buildings, residences, and other infrastructure. Electric power is transmitted over the transmission lines at a high voltage, and distributed to buildings and other structures at much lower voltages using electric power lines. Besides providing electric power, electric power lines can also be used to implement powerline communications within buildings and other structures. Powerline communications provides a means for networking electronic devices together and for connecting the electronic devices to the Internet. For example, HomePlug® devices can be used for wired broadband networking using IEEE P1901 standards for broadband over powerline communication.

SUMMARY

Various embodiments for error correction in a powerline communication power supply and modem interface system are disclosed. In one embodiment, an error correction unit comprises a correction signal generation unit and a filter unit. The correction signal generation unit is configured to receive an input AC line cycle signal, generate an error correction signal from the input AC line cycle signal, and sum the error correction signal with a sample of the input AC line cycle signal to reduce signal distortion from dynamic loading effects associated with the input AC line cycle signal. The filter unit is configured to filter and amplify an output from the correction signal generation unit to generate a corrected AC line cycle signal with reduced signal distortion.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
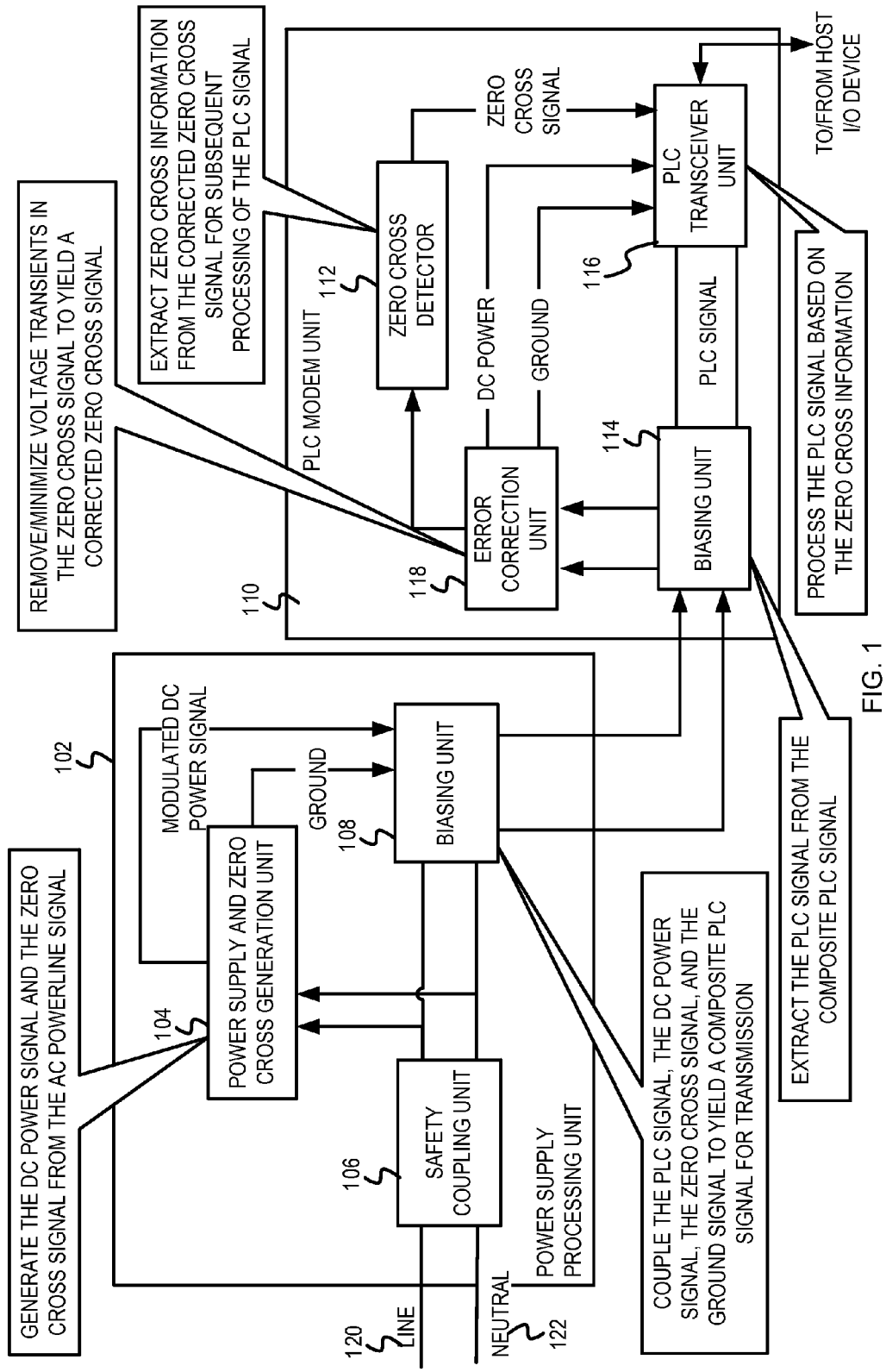
FIG. 1 is an example conceptual diagram illustrating one example of a powerline communication power supply and modem interface mechanism that utilizes a two-wire connection for transmitting power, PLC signal and zero cross information.

The description that follows includes exemplary systems, methods, techniques, instruction sequences, and computer program products that embody techniques of the present inventive subject matter. However, it is understood that the described embodiments may be practiced without these specific details. For instance, although examples refer to implementing a powerline communication power supply and modem interface mechanism for a powerline communication system with a two-wire power supply coupling to a power outlet, in other embodiments the powerline communication power supply and modem interface mechanism may include a three-wire power supply coupling to a power outlet. In other instances, well-known instruction instances, protocols, structures, and techniques have not been shown in detail in order not to obfuscate the description.

Powerline communication (PLC) modems can enable powerline communication via a powerline network. PLC modems are typically included within a PLC adapter module that is a self-contained unit comprising an integrated power supply, zero cross detector (e.g., for lining up PLC transmissions relative to the AC line cycle frequency), the PLC modem, and other signal processing components. The PLC adapter module is typically coupled to the powerline network via a power outlet, and is also coupled to a host device via a host interface (e.g., Ethernet) to provide data received via the powerline network.

As powerline communication gains wider acceptance, communication devices that implement other communication technologies can be configured to also support powerline communication to implement a cost-effective, single-point communication solution. For example, PLC capabilities may be incorporated into electronic systems such as set-top boxes, multimedia centers, gaming consoles, laptops, etc. In some embodiments, functionality of the PLC adapter module can be offloaded into two distinct units—a power supply processing unit and a PLC modem unit. The PLC modem unit can be integrated with other communication devices (e.g., a WLAN chipset) within an electronic system (e.g., mounted on one of the circuit boards within the electronic system). The power supply processing unit can comprise the power supply, zero cross detector, and safety coupling networks, and can be implemented external to the electronic system (e.g., in a wall module that connects to a power outlet). However, implementing such a single-point communication solution may require a multi-wire conducting cable/interface mechanism (for coupling the power supply processing unit with the PLC modem unit) with two conductors for power and power ground return, two conductors for exchange of bi-directional PLC signals, one conductor for indicating zero cross information, and in some cases additional conductors for control and shield signals. Such a multi-conductor cable assembly interface that employs non-standard, multi-conductor cabling is typically impractical, bulky and expensive.

In some embodiments, techniques can be implemented to support powerline communication via the power supply processing unit and the PLC modem unit on standard low-cost, two-wire (or multi-wire) cabling that can be identical (or similar) to the cabling used in ubiquitous AC adapter power supplies. From an input AC powerline signal, the power supply processing unit can generate the DC power signal and ground signal supplied to the PLC modem unit, and the zero cross signal that enables proper processing of the PLC signal by the PLC modem unit. The zero cross signal can be modulated onto the DC power signal. The power supply processing unit can combine the PLC signal (also extracted from the AC powerline signal) with the DC power signal (that comprises the modulated zero cross signal) to yield a composite PLC signal. The composite PLC signal can then be provided to the PLC modem unit (e.g., via the two-wire cable) for further processing. At the PLC modem unit, the zero cross signal can be extracted from the modulated DC power signal. The zero cross signal can be used to generate timing and synchronization information for proper processing of the PLC signal, as will be further described below. Such an external power supply/coupler mechanism using a two-wire interface can enable the PLC modem unit to effectively connect to the powerline network via the power supply processing unit without resorting to extra cabling and with little or no impact on powerline communication performance or circuit safety.

Changes in power consumption of the PLC modem unit can cause undesirable outcome. For example, high power components in the PLC modem can power up and draw additional current at various times. This can result in unwanted voltage drops that may be of the same peak-to-peak amplitude and frequency as the zero cross component of the composite PLC signal. As a result, the voltage drop in the composite PLC signal can interfere with the zero cross component of the composite PLC signal thereby making it difficult to recover the zero cross information. In some embodiments, as will be discussed below, an error correction unit can be implemented as part of the PLC modem unit. The error correction unit can "extract" distortion from low frequency signals (e.g., the zero cross signal) modulated onto the DC power signal and can provide a clean and stable input AC line cycle waveform to the zero cross unit.

FIG. 1 is an example conceptual diagram illustrating one example of a powerline communication power supply and modem interface mechanism that utilizes a conventional two-wire connection for transmitting power, PLC signal and zero cross information. Figure one depicts a power supply processing unit 102 coupled with a PLC modem unit 110. The power supply processing unit 102 comprises a safety coupling unit 106, a biasing unit 108, and a power supply and zero cross generation unit 104. The PLC modem unit 110 comprises a zero cross detector 112, a biasing unit 114, a PLC transceiver unit 116, and an error correction unit 118. The power supply processing unit 102 is coupled to the powerline network via a powerline socket (not shown in FIG. 1). In one implementation, the power supply processing unit 102 can be a wall module that is coupled with (either permanently coupled to or plugged in on-demand to) a powerline socket of the powerline network. In this implementation, the PLC modem unit 110 can be implemented within a PLC-enabled electronic device ("PLC device"), such as a laptop, a television set-top box, a multimedia center, a gaming console, and other suitable electronic devices. For example, the PLC modem unit 110 may be implemented within an integrated circuit that is mounted on a circuit board of the electronic device. In another example, the PLC modem unit 110 can be integrated with other communication devices (e.g., a WLAN device) within an integrated circuit (e.g., a system-on-a-chip (SoC)) that is mounted on a circuit board of the electronic device. In another implementation, the power supply processing unit 102 can be implemented as part of a power adapter (e.g., a laptop adapter) associated with the PLC device. In this implementation, the PLC modem unit 110 may be integrated within the PLC device (e.g., on the motherboard of the laptop). In some implementations, the power supply processing unit 102 can then be coupled to the PLC modem unit 110 via a two-wire (or multi-wire) cable.

As depicted in FIG. 1, the line terminal connecting wire 120 and the neutral terminal connecting wire 122 of the powerline socket are coupled to the safety coupling unit 106 of the power supply processing unit 102. The power supply processing unit 102 receives an AC powerline signal via the line terminal connecting wire 120 and the neutral terminal connecting wire 122. The AC powerline signal can comprise a high voltage AC power waveform (e.g., a 120V AC, 60 Hz waveform) and a superposed PLC signal. The PLC signal typically comprises control/management/data bits that are communicated from a source PLC device (not shown) to a destination PLC device (e.g., the PLC device comprising the PLC modem unit 110). The safety coupling unit 106 provides electrical isolation between the powerline network and users of the power supply processing unit 102.

The AC powerline signal at the output of the safety coupling unit 106 is provided to the power supply and zero cross generation unit 104. The power supply and zero cross generation unit 104 generates a DC power signal (modulated with a zero cross signal) and a ground signal from the AC powerline signal, as will be described with reference to FIGS. 3-6. The DC power signal provides the requisite DC voltage (e.g., 12V DC) to ensure operation of various digital processing components of the power supply processing unit 102 and the PLC modem unit 110. The ground signal provides a stable ground reference (e.g., for signal voltage measurement and analysis). The zero cross signal comprises zero cross information that indicates the zero crossings associated with the AC powerline signal (i.e., time instants at which the AC powerline signal crosses a zero voltage reference line or has a zero voltage). The power supply and zero cross generation unit 104 can modulate the zero cross signal onto the DC power signal, as will be further described with reference to FIGS. 3-6. The DC power signal modulated with the zero cross signal is herein referred to as the "modulated DC power signal." The power supply and zero cross generation unit 104 can provide the modulated DC power signal and the ground signal to the biasing unit 108. As will be further described with reference to FIG. 2, the biasing unit 108 can combine the modulated DC power signal and the ground signal with the PLC signal (extracted from the AC powerline signal) to yield a composite PLC signal, and can provide the composite PLC signal via a two-wire cabling (between the biasing units 108 and 114) to the PLC modem unit 110.

At the PLC modem unit 110, the biasing unit 114 extracts the PLC signal from the composite PLC signal and provides the extracted PLC signal to the PLC transceiver unit 116. As discussed above, dynamic changes in power consumption of a host device (associated with the PLC modem) can be undesirable. For example, RF power amplifiers of the host device may draw considerable current (e.g., 600 mA) causing additional dynamic voltage drops on the two-wire cabling (between the biasing units 108 and 114) and the RF chokes used to isolate the power and the signals on the two-wire cabling. The dynamic voltage drop can result in an unwanted AC component that is approximately the same amplitude as the desired zero cross signal. The frequency of the dynamic voltage drop may also be approximately equal to the desired zero cross signal. Accordingly, the dynamic voltage drops can make it very difficult to recover the zero cross information used for decoding the PLC signal.

As depicted in FIG. 1, the PLC modem unit 110 comprises the error correction unit 118 coupled between the biasing unit 114 and the zero cross detector 112. The biasing unit 114 can provide a combination of the modulated DC power signal (i.e., the DC power signal modulated by the zero cross signal) and the ground signal to the error correction unit 118. The error correction unit 118 can provide the modulated DC power signal and the ground signal to the PLC transceiver unit 116 to enable operation of the PLC transceiver unit 116. As will be further described below in FIGS. 7-9, the error correction unit 118 can reduce the distortion resulting from the dynamic loading effects on the zero cross signal and can provide a clean and stable zero cross signal (with little or no error) to the zero cross detector 112 to recover the zero cross information. The zero cross detector 112 can receive the zero cross signal from the error correction unit 118 and can extract the zero cross information from the zero cross signal. The zero cross detector 112 can then provide the zero cross information to the PLC transceiver unit 116 to enable subsequent processing of the PLC signal by the PLC transceiver unit 116. The PLC transceiver unit 116 can then process the PLC signal using the zero cross information.

Figure 2:
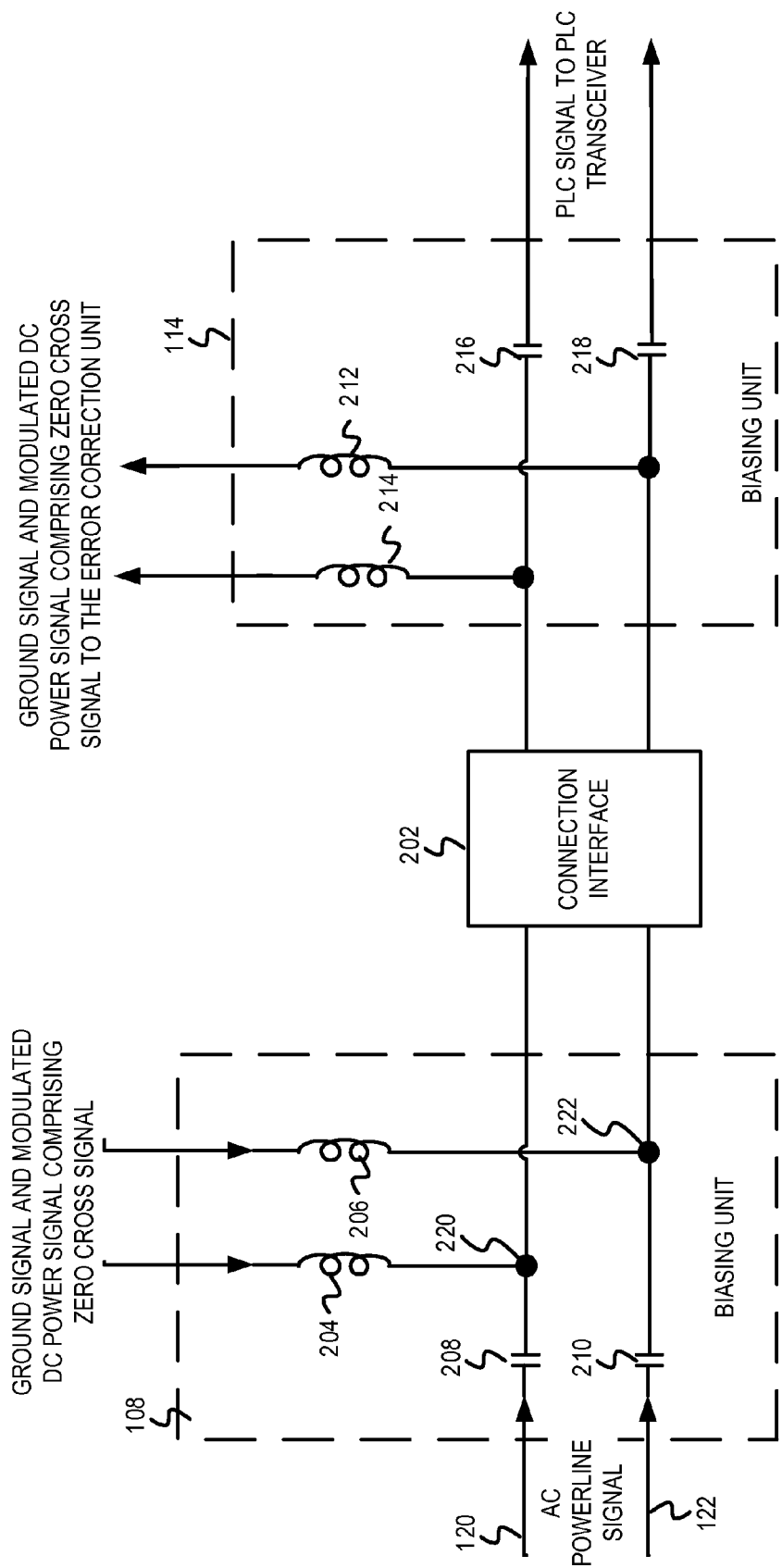
FIG. 2 is an example circuit diagram illustrating one embodiment of biasing circuits of the power supply processing unit and the PLC modem unit, according to some embodiments.

FIG. 2 is an example circuit diagram illustrating one embodiment of the biasing units of the power supply processing unit and the PLC modem unit, according to some embodiments. The biasing unit 108 of the power supply processing unit 102 receives the AC powerline signal including a PLC signal from the powerline network via two connecting wires (e.g., typically the line terminal connecting wire 120 and the neutral terminal connecting wire 122) through the safety coupling unit 106. The biasing unit 108 also receives the modulated DC power signal and the ground signal (along the two connecting wires) as described with reference to FIG. 1. The modulated DC power signal and the ground signal may be filtered by inductors 204 and 206 that are respectively coupled to the line terminal connecting wire 120 and the neutral terminal connecting wire 122. The inductors 204 and 206 pass (or present a low impedance path to) DC and low frequency signal components (e.g., the modulated DC power signal and the ground signal) and block (or present a high impedance path to) higher frequency signal components (e.g., the PLC signal). The AC powerline signal may be filtered by capacitors 208 and 210 coupled to the line terminal connecting wire 120 and the neutral terminal connecting wire 122, respectively. The capacitors 208 and 210 block the DC and the low frequency signal components (e.g., the modulated DC power signal and the ground signal) and provide a low impedance path for the high frequency PLC signal. After filtering, the modulated DC power signal and the ground signal at the output terminals of the inductors 204 and 206 and the PLC signal at the output of the capacitors 208 and 210 are coupled (depicted by summing nodes 220 and 222 on the line terminal connecting wire 120 and the neutral terminal connecting wire 122, respectively) to yield a composite PLC signal. The biasing unit 108 then provides the composite PLC signal to the biasing unit 114 of the PLC modem unit 110 via the two-wire (or multi-wire) cable. In one implementation, the connection interface 202 may be a two-pin plug and socket connection device that couples the power supply processing unit 102 to the PLC modem unit 110.

The biasing unit 114 receives the composite PLC signal from the power supply processing unit 102 via the line terminal connecting wire 120 and the neutral terminal connecting wire 122. As discussed above, the composite PLC signal comprises the modulated DC power signal (i.e., the DC power signal modulated by the zero cross signal), the ground signal, and the PLC signal. In the example of FIG. 2, the low-frequency components of the composite signal (e.g., the modulated DC power signal and the ground signal) are "passed through" inductors 212 and 214 while the higher frequency PLC signal is "passed through" capacitors 216 and 218, as will be further described below. The biasing unit 114 passes the composite PLC signal through capacitors 216 and 218 coupled to the line terminal connecting wire 120 and the neutral terminal connecting wire 122, respectively, to yield a PLC signal that is provided to the PLC transceiver unit 116 for subsequent processing. The capacitors 216 and 218 block the DC and the low frequency signals (i.e., the modulated DC power signal and the ground signal) and provide a low impedance path for the high frequency PLC signal. The biasing unit 114 also passes the composite PLC signal through inductors 214 and 212 on the line terminal connecting wire 120 and the neutral terminal connecting wire 122 to yield the ground signal and the modulated DC power signal, which is subsequently corrected (e.g., by error correction unit 118) to minimize/remove voltage transients in the zero cross signal and processed (e.g., by the zero cross detector 112) to extract the zero cross information (as will be further described with reference to FIGS. 7-9). The inductors 214 and 212 pass the DC and low frequency signals and block the higher frequency PLC signals. It is noted that the values of the inductors 204, 206, 212, and 214 and the values of the capacitors 208, 210, 216, and 218 can be selected based, at least in part, on the frequency of the PLC signal.

Figure 3:
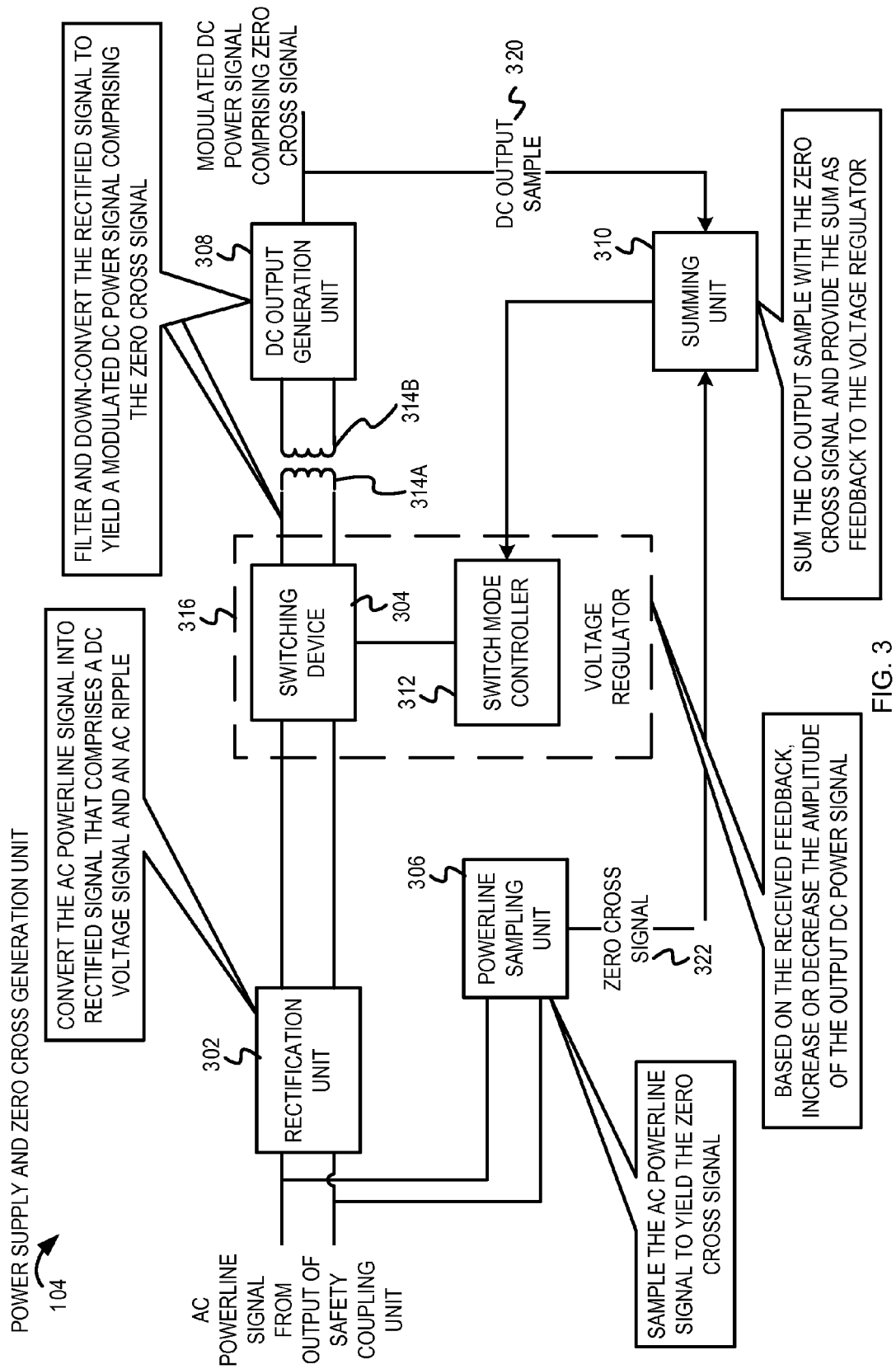
FIG. 3 is a block diagram illustrating one example of the power supply and zero cross generation unit.

FIG. 3 is a block diagram illustrating one example of the power supply and zero cross generation unit 104. The power supply and zero cross generation unit 104 converts an AC power signal received from the powerline socket to a low voltage direct current (DC) signal, which is provided to electronic components (e.g., integrated circuits (ICs)) that utilize a constant, stable DC voltage source for proper operation. The power supply and zero cross generation unit 104 comprises a rectification unit 302, a voltage regulator 316, a DC output generation unit 308, a summing unit 310, and a powerline sampling unit 306. The voltage regulator 316 comprises a switch mode controller 312 and a switching device 304. As described with reference to FIG. 1, the AC powerline signal received on the line terminal connecting wire 120 and the neutral terminal connecting wire 122 from the powerline socket is provided to the safety coupling unit 106 (not shown in FIG. 1). The AC powerline signal at the output of the safety coupling unit 106 is provided to the rectification unit 302. It should be noted, however, that in other embodiments, the AC powerline signal may be directly provided to the rectification unit 302 (e.g., without the safety coupling unit 106). The output of the rectification unit 302 is further coupled with the switching device 304 of the voltage regulator 316. The output of the switching device 304 is coupled with the primary winding 314A of a transformer, while the second winding 314B of the transformer is coupled with the DC output generation unit 308. The DC signal at the output of the DC output generation unit 308 is sampled, and the resulting DC sample 320 is provided to the summing unit 310. Furthermore, the powerline sampling unit 306 samples the AC powerline signal received (via the safety coupling unit) on the line terminal connecting wire 120 and the neutral terminal connecting wire 122 from the powerline socket. The output of the powerline sampling unit 306 is a zero cross signal 322 and is provided to the summing unit 310. The output of the summing unit 310 is provided to the switch mode controller 312. The switch mode controller 312 controls the operation of the switching device 304.

Figure 4:
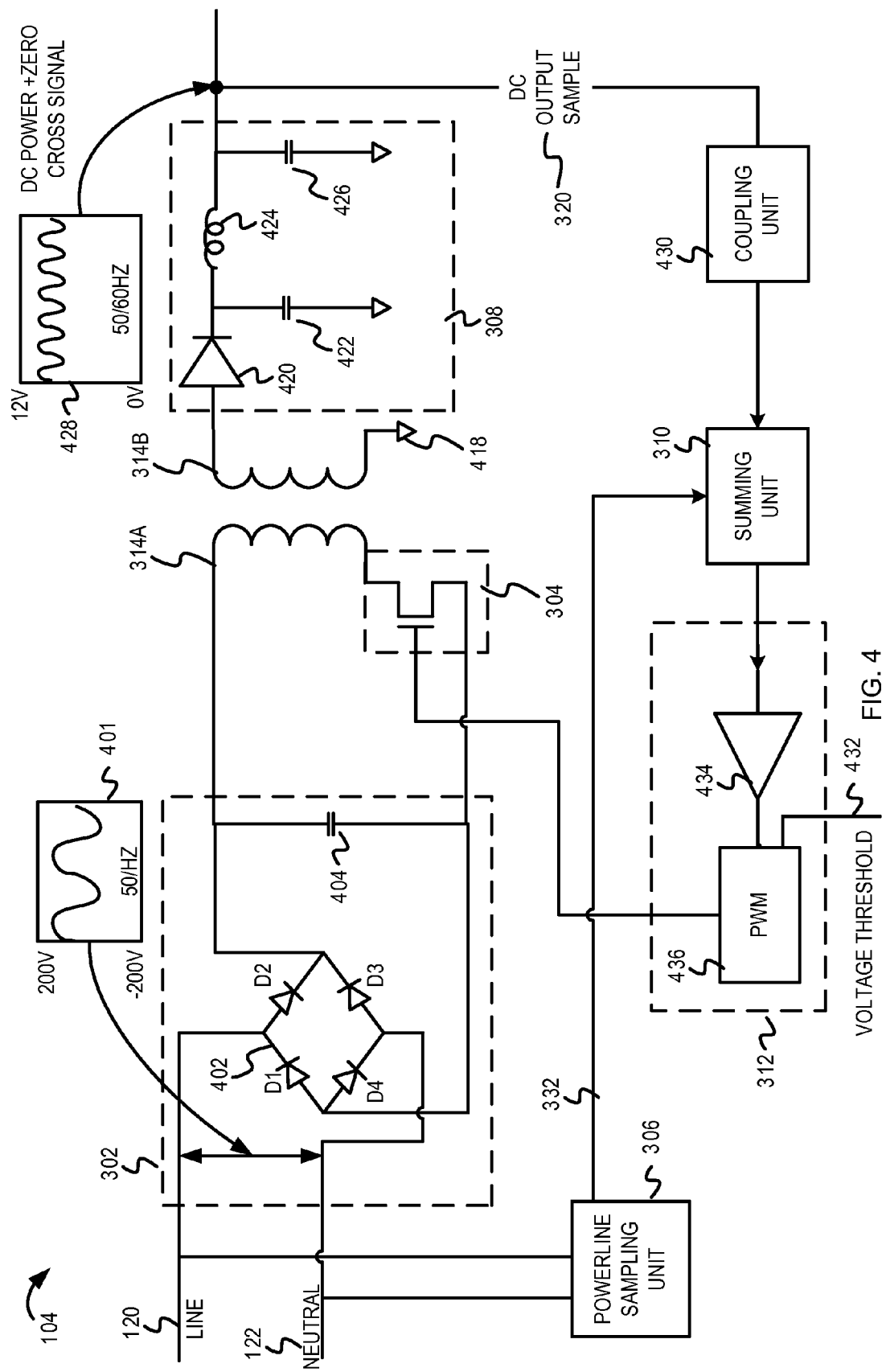
FIG. 4 is an example circuit diagram illustrating one embodiment of the power supply and zero cross generation unit.

After receiving the AC powerline signal, the rectification unit 302 converts the AC powerline signal into a DC voltage signal comprising an AC ripple ("rectified signal"). As depicted in the example circuit diagram of the power supply and zero cross generation unit 104 of FIG. 4, the rectification unit 302 comprises a diode bridge 402 and a capacitor 404. The diode bridge comprises four diodes—D1, D2, D3, and D4. The cathode of D1 is coupled to the anode of D2; the cathode of D2 is coupled to the cathode of D3; the anode of D3 is coupled to the cathode of D4; and the anode of D4 is coupled to the anode of D1. One set of opposite ends of the diode bridge 402 are coupled to input terminals of the power supply and zero cross generation unit 104. In FIG. 4, the line terminal connecting wire 120 is coupled to the interconnection of the cathode of D1 and the anode of D2. The neutral terminal connecting wire 122 is coupled to the interconnection of the anode of D3 and the cathode of D4. Although not depicted in FIG. 4, it is noted that in some embodiments, a safety coupling unit 106 may be coupled between the line and neutral terminal connecting wires and the rectification unit 302. The other set of opposite ends of the diode bridge 402 serve to couple the diode bridge 402 in parallel with the capacitor 404. In FIG. 4, the interconnection of the cathode of D1 and the anode of D2 is coupled to one end of the capacitor 404. The interconnection of the anodes D1 and D4 is coupled to the other end of the capacitor 404 and also to a first terminal of the primary winding 314A of a transformer. In response to receiving an input AC powerline waveform 401, the diode bridge 402 in conjunction with the capacitor 404 can convert the input AC powerline waveform 401 into a rectified signal (not depicted in FIG. 4). The rectified signal comprises a DC voltage signal with a superimposed AC ripple. The rectified signal is then coupled to the high voltage primary winding 314A of a transformer. The transformer decreases (or steps-down) the amplitude of the rectified signal (based on the ratio of the number of turns of the primary winding 314A of the transformer to the number of turns of the secondary winding 314B of the transformer) to generate a low voltage rectified signal. The low voltage rectified signal at the secondary winding 314B of the transformer is then provided as input to the DC output generation unit 308.

The DC output generation unit 308 can comprise one or more filter stages that filter the rectified signal and minimize the AC ripple from the rectified signal to yield the DC power signal. In one example, as depicted with reference to FIG. 4, the DC output generation unit 308 can comprise a rectifier with a capacitor filter network. In FIG. 4, the DC output generation unit 308 comprises a diode 420 that is coupled to the output of the secondary winding 314B of the transformer. The diode 420 is also connected in series with a C-L-C pi filter. In the example shown in FIG. 4, the positive terminal of the diode 420 can be coupled to a first output terminal of the secondary winding 314B of the transformer, and the negative terminal of the diode 420 can be coupled to a first terminal of an inductor 424 and to a first terminal of a capacitor 422. The second terminal of the inductor 424 can be coupled to a first terminal of a capacitor 426. The second terminals of the capacitors 422 and 426 and the second output terminal of the secondary winding 314B of the transformer can be coupled to ground 418. In one implementation, the values of the capacitor 422, the inductor 424, and the capacitor 426 can be selected based, at least in part, on the line frequency of the AC powerline waveform 401. The diode 420 can rectify the low voltage signal at the output of the secondary winding 314B of the transformer, while the filter can reduce the high frequency ripple.

The DC power signal at the output of the DC output generation unit 308 is sampled (e.g., by a feedback unit, not shown in FIG. 3) and the resultant DC output sample 320 is fed back into the closed loop system of the power supply and zero cross generation unit 104. As shown in FIGS. 3 and 4, the DC output sample 320 is provided as one input to the summing unit 310 via the feedback loop. In one implementation, as depicted with reference to FIG. 4, the DC output sample 320 can be fed back into the closed loop system via a coupling unit 430 (e.g., an opto-coupler) that isolates high voltage components (e.g., the rectification unit 302) from low voltage components (e.g., the DC output generation unit 308). In another implementation, the DC output sample 320 can be fed back into the closed loop system via an impedance matching unit (not shown in FIG. 4). In another implementation, the DC output sample 320 can be directly fed back into the closed loop system. The feedback loop can enable the voltage regulator 316 to quickly react to and counter the effect of any transient line voltage variation (i.e., in the input AC powerline waveform 401) and load current variation. As will be further described below, within the voltage regulator 316, the switch mode controller 312 can appropriately control the duty cycle of the switching device 316 to regulate and to maintain a relatively constant output DC voltage over load and line variations.

Additionally, the powerline sampling unit 306 samples the AC powerline signal 401 to yield an AC line cycle sample that is also injected into the closed loop system. The AC line cycle sample is representative of the zero cross information associated with the AC powerline signal 401 and is herein referred to as the zero cross signal 322. The zero cross information indicates the zero crossings associated with the AC powerline waveform 401. The powerline sampling unit 306 can use various techniques to generate the zero cross signal. In one implementation as depicted in FIG. 4, the zero cross signal 322 can be a reduced amplitude version of the AC powerline signal 401 (e.g., a sine wave). In this implementation, the zero crossings occur at exactly the same frequency as the AC line frequency (e.g., 50 Hz or 60 Hz depending on the region of operation). In another implementation, the zero cross signal can be generated from the AC ripple at the output of the rectification unit 302. In this implementation, the zero crossings occur at twice the AC line frequency, if a full-wave rectifier is employed as part of the rectification unit 302. However, the zero crossings can occur at the AC line frequency, if a half-wave rectifier is employed as part of the rectification unit 302. It is noted that the powerline sampling unit 306 can be any suitable sampling devices (e.g., a 1-bit ADC). The powerline sampling unit 306 provides the zero cross signal 322 as a second input to the summing unit 310. Thus, the zero cross signal 322 (i.e., the AC powerline signal sample) and the DC output sample 320 are provided as inputs to the summing unit 310. The summing unit 310 can combine the DC output sample 320 with the zero cross signal 322 to yield a feedback signal that is provided to the switch mode controller 312 of the voltage regulator 316. Although not depicted in FIG. 4, in some implementations, the summing unit 310 can also comprise one or more gain stages to amplify/attenuate the feedback signal prior to providing the feedback signal to the switch mode controller 312. Furthermore, in some implementations, the summing unit 310 can comprise other processing components (e.g., a phase shift unit) to "tailor" the error signal as desired (e.g., to vary the position of signal peaks in the error signal).

The switch mode controller 312 can compare the feedback signal with a threshold signal and accordingly generates an error signal that indicates whether the DC power signal level should be increased or decreased to maintain stability of the DC power signal. In one example, as depicted with reference to FIG. 4, the switch mode controller 312 comprises a comparator 434 coupled with a pulse width modulator (PWM) 436. The feedback signal generated by the summing unit 310 is provided as one input to the comparator 434. The other input to the comparator 434 is a voltage threshold 432 that indicates the amplitude at which the DC power signal (at the output of the DC output generation unit 308) is to be maintained. The comparator 434 can monitor the DC power signal level by comparing the feedback signal (i.e., the DC output sample 320) against the voltage threshold 432 and can accordingly generate the error signal. The error signal can be proportional to the difference between the DC power signal level at the output of the power supply and zero cross generation unit 104 (i.e., the output DC sample 320) and the desired DC power output (i.e., the voltage threshold 432). In one implementation, the error signal may be calculated as the difference between the output DC sample 320 and the voltage threshold 432. In another implementation, the error signal may be a scaled representation of the difference between the output DC sample 320 and the voltage threshold 432. In one example, a positive error signal can be generated if the amplitude of the feedback signal is greater than the voltage threshold 432, and a negative error signal can be generated if the amplitude of the feedback signal is less than the voltage threshold 432.

The PWM 436 can receive the error signal as an input and can generate a switching waveform with a duty cycle that is based on the error signal. In one implementation, the switching waveform can be a rectangular waveform that is applied to the switching device 304 to control the frequency with which the switching device 304 is switched on/off. The DC power signal level can be maintained at approximately the voltage threshold 432 by controlling when and for how long the switching device 304 switches on or switches off. In one example, as depicted with reference to FIG. 4, the switching device 304 can comprise a power field effect transistor (FET). In the example shown in FIG. 4, the output of the PWM 436 is coupled to the gate terminal of the FET, the drain terminal of the FET can be coupled to the one end of the diode bridge 402 (e.g., the interconnection of the anodes of D1 and D4), and the source terminal of the FET can be coupled to a second terminal of the primary winding 314A of the transformer. In one implementation, the PWM 436 can control (using the switching waveform) the gate voltage applied to (and/or the duration for which the gate voltage is applied to) the power FET to control the impedance of the power FET. This, in turn, can cause the power FET to vary the amount of the rectified signal coupled to the primary winding 314A of the transformer. For example, in response to determining that the DC power signal level is greater than the threshold voltage 432, the PWM 436 can cause the switching device 304 to switch off. Accordingly, a smaller percentage of the rectified signal can be coupled to the primary winding 314A of the transformer, thus decreasing the DC power signal level. In response to determining that the DC power signal level is less than the threshold voltage 432, the PWM 436 can cause the switching device 304 to switch on. Accordingly, a larger percentage of the rectified signal can be coupled to the primary winding 314A of the transformer, thus increasing the DC power signal level. In some implementations, the switch mode controller 312 and/or the switching device 304 can also comprise a filter stage for filtering the switching noise and other transient noise effects. Furthermore, as described above, the feedback signal provided to the switch mode controller 312 also comprises the zero cross signal 322. The net effect of injecting the zero cross signal 322 into the feedback path (via the summing unit 310) is a modulation of the zero cross signal 322 on the primary winding 314A of the transformer. This modulation is coupled to the secondary winding 314B of the transformer so the DC power signal at the output of the DC output generation unit 308 is modulated with the zero cross signal 322 (e.g., as depicted by the waveform 428 in FIG. 4).

Figure 5:
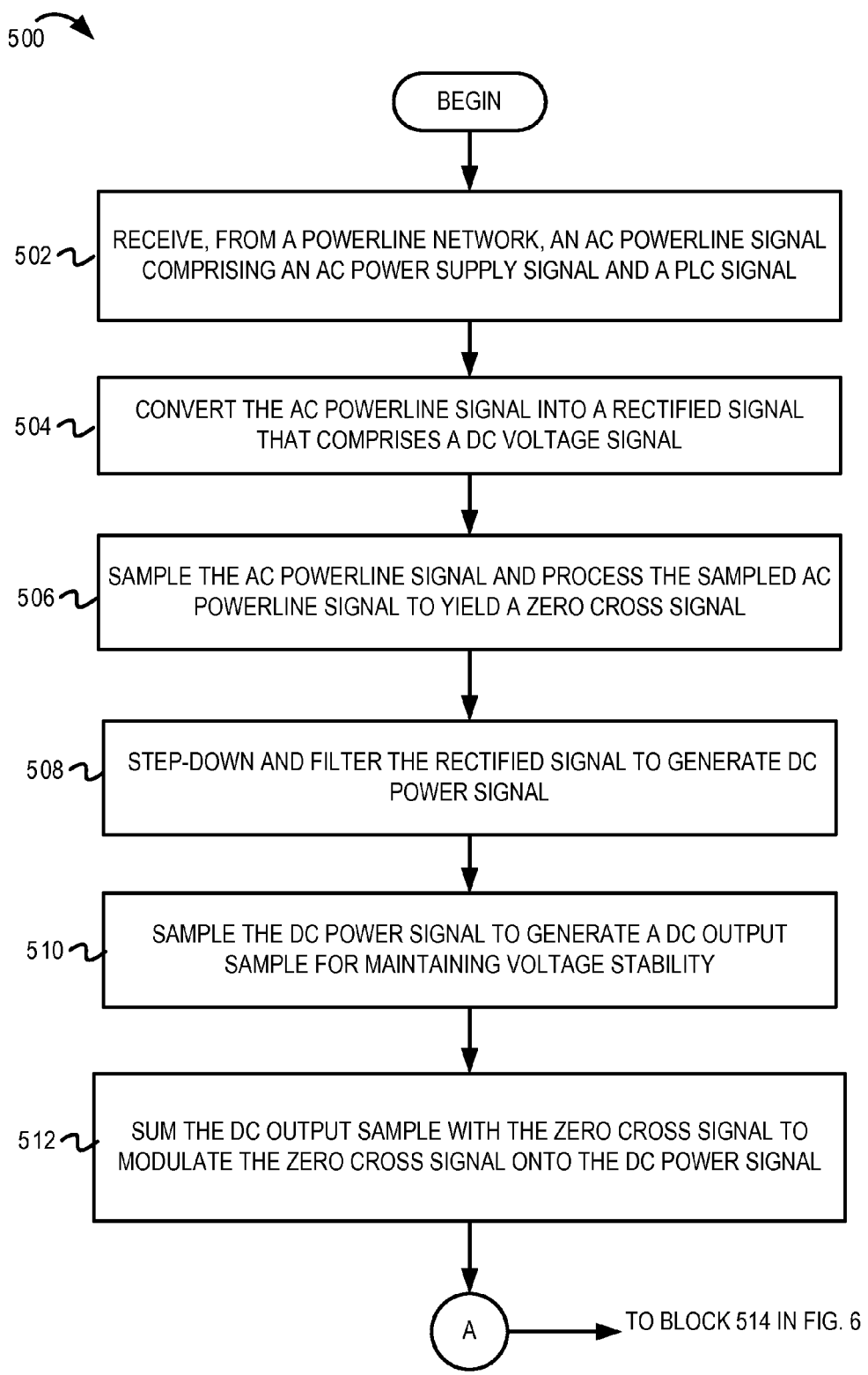
FIG. 5 is a flow diagram illustrating example operations for modulating a zero cross signal onto a DC power signal and generating a composite PLC signal.
Figure 6:
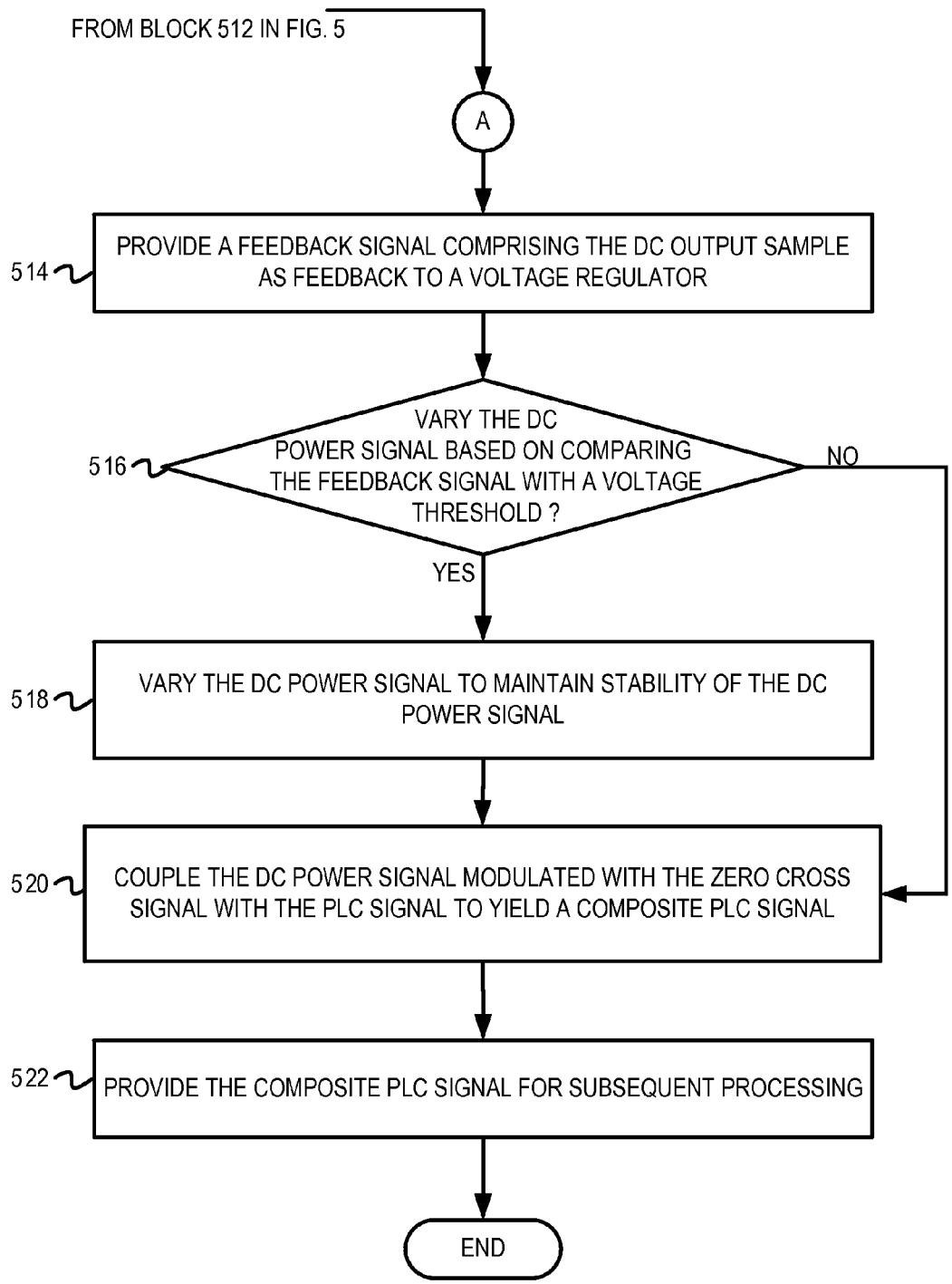
FIG. 6 is a continuation of FIG. 5 and also illustrates example operations for modulating a zero cross signal onto a DC power signal and generating a composite PLC signal.

FIG. 5 and FIG. 6 depict a flow diagram ("flow") 500 illustrating example operations for modulating a zero cross signal onto a DC power signal and generating a composite PLC signal. The flow 500 begins at block 502 in FIG. 5.

At block 502, an AC powerline signal is received from a powerline network. For example, with reference to FIG. 1, the power supply processing unit 102 can receive the AC powerline signal via the line terminal connecting wire 120 and the neutral terminal connecting wire 122 from the powerline network. The safety coupling unit 106 can receive the AC powerline signal from the line terminal connecting wire 120 and the neutral terminal connecting wire 122. The AC powerline signal at the output of the safety coupling unit 106 can be provided to the power supply and zero cross generation unit 104 and the biasing unit 108 for subsequent processing as will be further described below. The AC powerline signal may be received from a source PLC device and the power supply processing unit 122 may be implemented as part of a destination PLC device. The AC powerline signal can comprise a PLC signal (e.g., including data/control/management bits) superposed on an AC power supply signal (e.g., a 120V/60 Hz AC power supply signal). The flow continues at block 504.

At block 504, the AC powerline signal is converted into a rectified signal that comprises a DC voltage signal. For example, as described above with reference to FIGS. 3-4, the rectification unit 302 of the power supply and zero cross generation unit 104 can receive the AC powerline signal and generate the rectified signal. As one example, the rectification unit 302 may receive a 120V AC powerline waveform 401 and generate a rectified waveform that comprises a 30V AC ripple superimposed on a 170V DC signal. As another example, the rectification unit 302 may receive a 240V AC powerline waveform 401 and generate a rectified waveform that comprises a 30V AC ripple superimposed on a 340V DC signal. Additionally, the frequency of the AC ripple is twice the frequency of the line frequency of the AC powerline waveform 401. For example, if the line frequency is 60 Hz, the AC ripple frequency will be 120 Hz. The flow continues at block 506.

At block 506, the AC powerline signal is sampled and processed to yield a zero cross signal. For example, as described above with reference to FIGS. 3-4, the powerline sampling unit 306 can sample the AC powerline signal 401 and scale the sampled AC powerline signal by a predetermined scale factor (if needed) to yield the zero cross signal. As will be described below, the zero cross signal can be modulated onto the output DC voltage to enable proper processing of the PLC signal at the PLC modem unit 110. The flow continues at block 508.

At block 508, the rectified signal is stepped-down and filtered to generate a DC power signal. For example, as described above with reference to FIGS. 3-4, the rectification unit 302 can provide the rectified signal (generated at block 304) to the primary winding 314A of a transformer. The transformer can step down the high voltage rectified signal (e.g., a 170V DC signal component) to yield a low voltage rectified signal (e.g., a 3.3V DC signal component). The DC output generation unit 308 can then filter the low voltage rectified signal and minimize the AC component from the low voltage rectified signal to generate the DC power signal. As described above, the DC power signal can be provided to subsequent processing units that utilize a stable low DC voltage for proper operation. The flow continues at block 510.

At block 510, the DC power signal is sampled to generate a DC output sample for maintaining voltage stability. For example, as described above with reference to FIGS. 3-4, the DC power signal at the output of the DC output generation unit 308 can be sampled to generate the DC output sample 320. The DC output sample 320 can be provided (via the summing unit 310) as feedback to maintain a relatively stable DC power signal level regardless of line and load variations. The flow continues at block 512.

At block 512, the DC output sample is summed with the zero cross signal to modulate the zero cross signal onto the DC power signal. For example, as described above with reference to FIGS. 3-4, the summing unit 310 can combine (or sum) the DC output sample 320 (determined at block 510) with the zero cross signal 322 (determined at block 506). The net effect of coupling the zero cross signal into the feedback path is a modulation of the zero cross signal on the DC power signal. The DC output sample with the modulated zero cross signal (i.e., the feedback signal) can then be provided to the voltage regulator 316 for maintaining a stable DC power signal level and for ensuring that the zero cross signal is coupled with the DC power signal at the output of the power supply and zero cross generation unit 104. As will be described below, the modulation of the zero cross signal on the DC power signal at the output of the power supply and zero cross generation unit 104 can also be provided (in conjunction with the PLC signal) for subsequent processing of the PLC signal by the PLC modem unit 110. The flow continues at block 514 in FIG. 6.

At block 514, a feedback signal comprising the DC output sample is provided to the voltage regulator. As described above with reference to FIGS. 3-4, the DC output sample 322 is fed back into the closed loop system of the power supply and zero cross generation unit 104 to maintain stability of the DC power signal. The summing unit 310 combines the DC output sample 320 and the zero cross signal 322 to generate the feedback signal. The summing unit 310 provides the feedback signal to the switch mode controller 312 of the voltage regulator 316. The flow continues at block 516.

At block 516, it is determined whether to vary the DC power signal level based on comparing the feedback signal with a voltage threshold. For example, as described above with reference to FIGS. 3-4, the switch mode controller 312 can compare the DC output sample 320 (e.g., the DC level of the feedback signal received at block 512) with the voltage threshold 432. The switch mode controller 312 can generate an error signal that is proportional to the difference between the DC output sample 320 and the voltage threshold 432. As will be described below, based on the error signal, the switch mode controller 312 and the switching device 304 can maintain a relatively constant DC power signal level. If it is determined to vary the DC power signal level, the flow continues at block 518. Otherwise, the flow continues at block 520.

At block 518, the DC power signal level is varied to maintain stability of the DC power signal. For example, as described above with reference to FIGS. 3-4, the switch mode controller 312 (e.g., the PWM 436 of the switch mode controller 312) can generate a switching waveform (based on the error signal) to control the operating mode of the switching device 304. The switch mode controller 312 can apply the switching waveform to the switching device 304 to cause the switching device to switch on or switch off for a predetermined time interval that is dependent on the duty cycle of the switching waveform (and consequently on the error signal). Accordingly, the voltage input at the primary winding 314A of the transformer can be varied to maintain a relatively constant DC power signal level (at the output of the secondary winding 314B of the transformer) regardless of line and load variations. The flow continues at block 520.

At block 520, the DC power signal modulated with the zero cross signal and the PLC signal are coupled to yield a composite PLC signal. For example, as described with reference to FIGS. 1-2, the biasing unit 108 of the power supply processing unit 102 can couple the PLC signal with the modulated DC power signal (comprising the zero cross signal) to yield the composite PLC signal. In some implementations, the power supply and zero cross generation unit 104 can also generate a ground signal. In this implementation, the biasing unit 108 can couple the PLC signal, the modulated DC power signal (comprising the zero cross signal), and the ground signal to yield the composite PLC signal. As described above with reference to FIG. 2, the biasing unit 108 can filter the AC powerline signal to remove low frequency signal components and to extract the PLC signal. The biasing unit 108 can also filter the modulated DC power signal and the ground signal received from the power supply and zero cross generation unit 104 to remove unwanted higher frequency components. The biasing unit 108 can then combine the PLC signal with the modulated DC power signal and the ground signal to generate the composite PLC signal. The flow continues at block 522.

At block 522, the composite PLC signal is provided for subsequent processing. For example, as described above with reference to FIGS. 1-2, the biasing unit 108 of the power supply processing unit 102 can provide the composite PLC signal to the biasing unit 114 of the PLC modem unit 110. In some implementations, the biasing unit 108 and the biasing unit 114 may be coupled via a connection interface 202. In another implementation, the biasing units 108 and 114 may be directly coupled via a two-wire (or a multi-wire) plug and socket connection. The operations of the PLC modem unit 110 are further described with reference to FIGS. 7-9. From block 522, the flow ends.

It is noted that although FIG. 6 depicts the flow 500 moving from block 518 to block 520, the operations of blocks 514-518 and the operations of blocks 520-522 are typically performed in parallel. In other words, the DC power signal is continuously sampled and monitored to maintain a constant DC power signal level. The zero cross signal (i.e., the sample of the AC powerline signal) is also continuously coupled with the DC power signal so that the output of the DC output generation unit 308 is a modulation of the zero cross signal on the DC power signal. Additionally, it is also noted that although FIGS. 4-6 describe the summing unit 310 coupling the feedback signal (comprising the DC output sample 320) to the signal input of the comparator 434, embodiments are not so limited. In other embodiments, the feedback signal may be coupled to (or summed with) the voltage threshold input 432 of the comparator 434.

After the composite PLC signal is generated in accordance with operations described in FIGS. 3-6, the composite signal is provided to the PLC modem unit 110. As described above with reference to FIG. 2, the biasing unit 114 of the PLC modem unit 110 can extract the PLC signal from the composite PLC signal and can provide the extracted PLC signal to the PLC transceiver unit 116 for subsequent processing. The biasing unit 114 can provide the modulated DC power signal including the zero cross signal to the error correction unit 118. The error correction unit 118 can extract and provide the DC power signal and the ground signal to the PLC transceiver unit 116. As will be further discussed with reference to FIGS. 7-8, the error correction unit 118 can remove/minimize any errors or voltage transients in the zero cross signal and can then provide the corrected zero cross signal to the zero cross detector 112.

Figure 7:
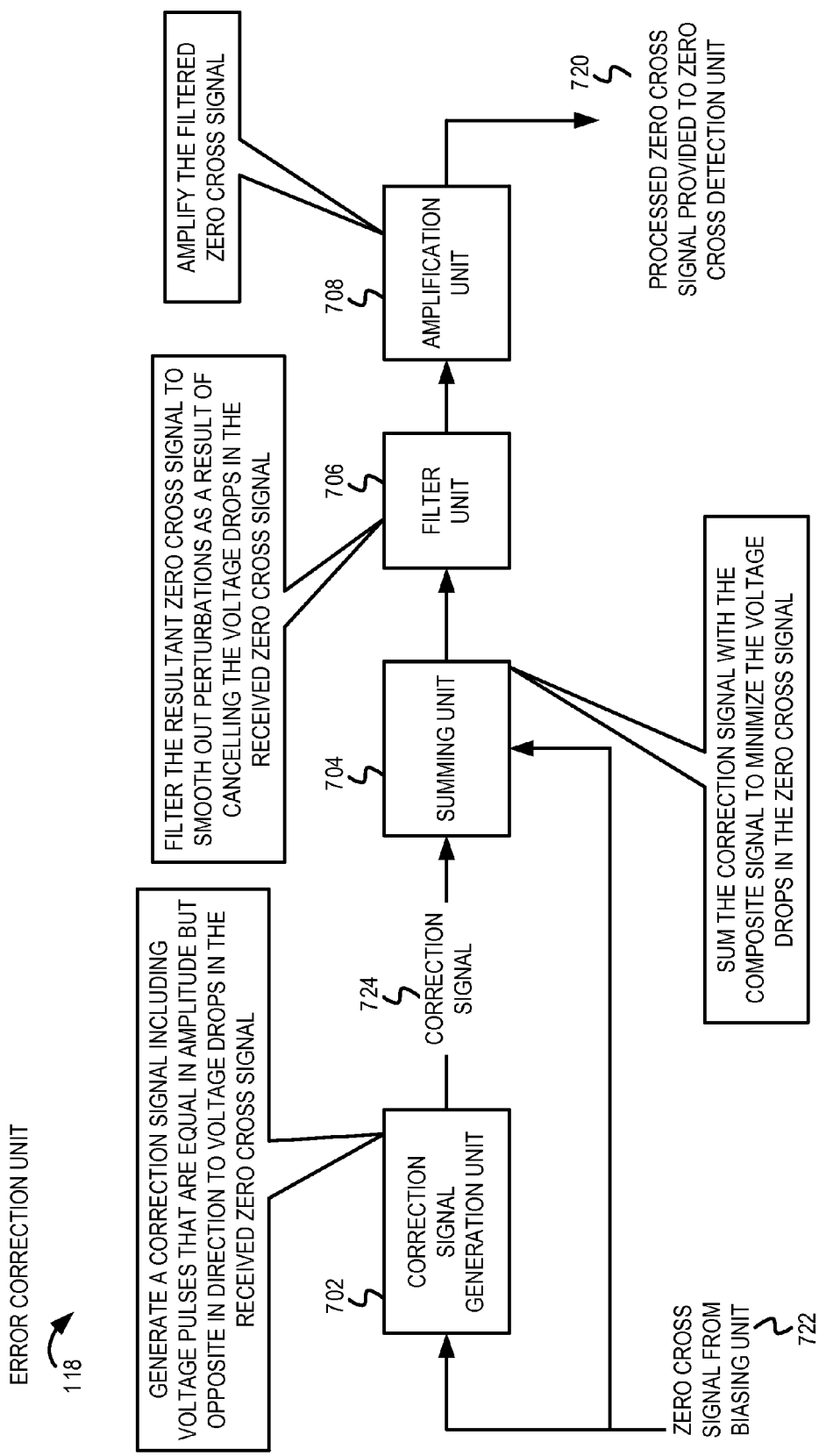
FIG. 7 is an example block diagram of one embodiment of the error correction unit.

FIG. 7 is an example block diagram of one embodiment of the error correction unit 118. The error correction unit 118 comprises a correction signal generation unit 702, a summing unit 704, a filter unit 706, and an amplification unit 708. As discussed above, one or more components of the PLC modem unit 110 can draw considerable current causing additional dynamic voltage drops on the two-wire cabling (between the biasing units 108 and 114). The dynamic voltage drops can be approximately equal in magnitude and frequency as the desired zero cross signal.

Figure 8:
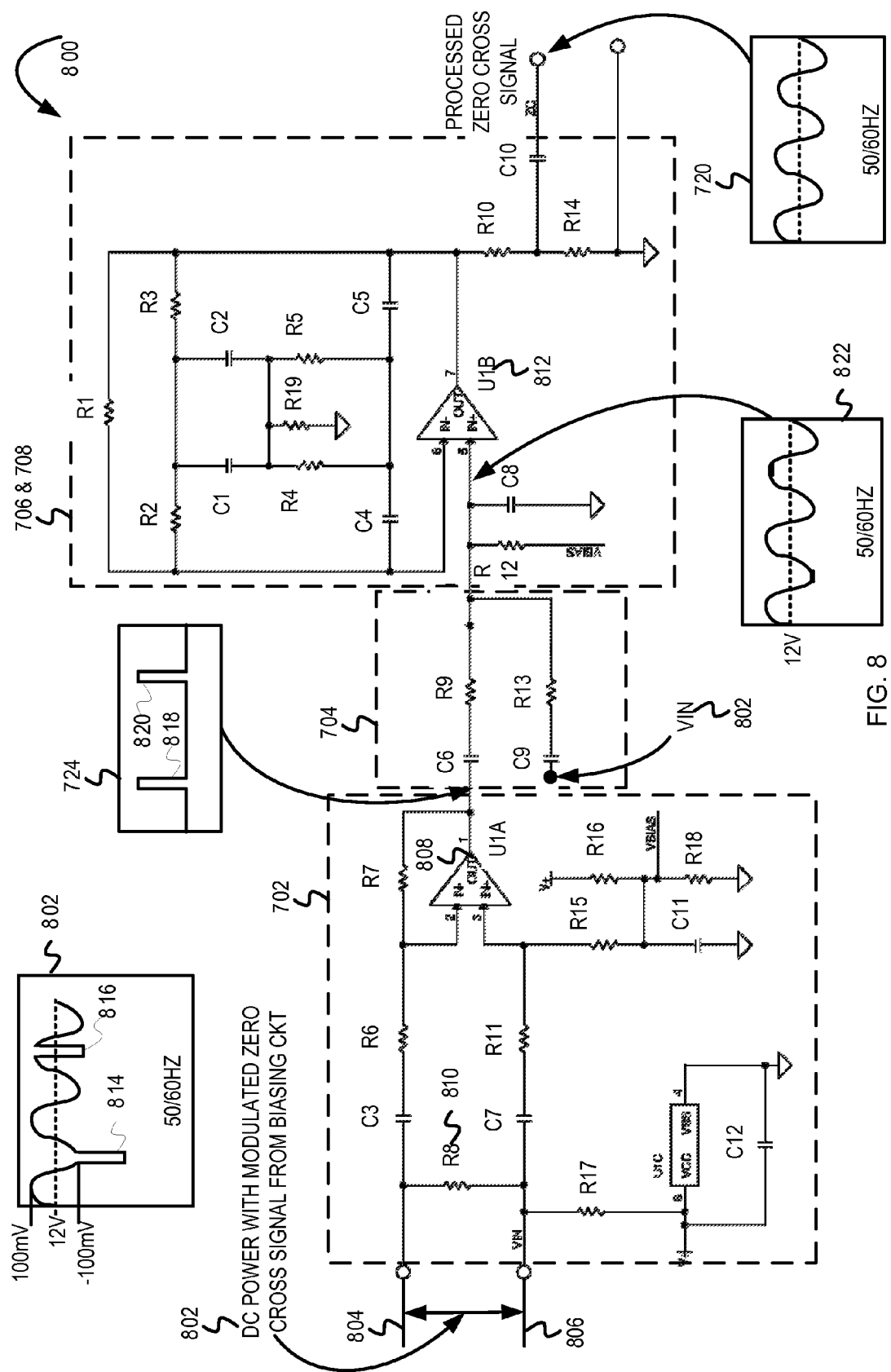
FIG. 8 is an example circuit diagram illustrating one embodiment of the error correction unit.

The correction signal generation unit 702 can receive a zero cross signal 722 including one or more voltage drops from the biasing unit 114. The correction signal generation unit 702 can generate a correction signal 724 that comprises voltage pulses that coincide with the voltage drops present in the received AC zero cross signal 722. The voltage pulses of the correction signal 724 are approximately equal in magnitude but opposite in polarity (direction) as compared to the voltage drops in the AC zero cross signal 722. The summing unit 704 sums a sample of the zero cross signal 722 and the correction signal 724 to minimize the voltage drops (i.e., distortion) in the zero cross signal 722. The filter unit 706 then filters the resultant zero cross signal; while the amplification unit 708 amplifies the filtered zero cross signal to yield a corrected zero cross signal 720. In some embodiments, the filter unit 706 can be a band-pass filter tuned to 55 Hz such that AC line cycle frequencies between 50 and 60 Hz are passed through to the amplification unit 708 and other frequencies are blocked. In other embodiments, the filter unit 706 can comprise other suitable filtering mechanism. It is further noted that, in some embodiments as depicted in FIG. 7, the filtering unit 706 and the amplification unit 708 can be implemented separately. In other embodiments, however, the filtering unit 706 and the amplification unit 708 can be implemented as part of the same circuit (e.g., as depicted in FIG. 8). The corrected zero cross signal 720 is provided to the zero cross detector 114. As will be further discussed in FIG. 9, the zero cross detector 114 can use the corrected zero cross signal 720 to generate the zero cross information (for subsequently processing the PLC signal).

FIG. 8 is an example circuit diagram 800 illustrating one embodiment of the error correction unit 118. The circuit diagram 800 of FIG. 8 shows one possible implementation of the correction signal generation unit 702, the summing unit 704, the filter unit 706, and the amplification unit 708. An input signal 802 (referred to in FIG. 8 as "Vin") can be provided at the input terminals 804 and 806 of the error correction unit 118. In this example, the input signal 802 is received from the biasing unit 114 and is a composite of the DC power signal, the ground signal, and the zero cross signal (which is modulated onto the DC power signal). As discussed above, this input voltage Vin 802 can sag/droop when high-powered components in the PLC modem unit 110 are powered ON/OFF. In other words, because there is a finite resistance along a DC power cord that couples these high-powered components, when these components are switched ON, the current drawn by the components increases, and consequently there are voltage drops in the input voltage signal Vin.

The input signal Vin 802 can be provided to the error correction unit 118 via the terminal 806. The DC power signal and the ground signal can be provided to the PLC transceiver unit 116 (and other components of the PLC modem unit 110) via the terminal 804. FIG. 8 also depicts a graph of the input signal 802 including voltage drops 814 and 816. In the example shown in FIG. 8, the input signal 802 has a nominal DC voltage level of 12V. A zero cross signal is superimposed on the 12V DC signal. In this example, the zero cross signal has a peak voltage of 100 mV. As illustrated, the magnitude of the voltage drops 814 and 816 can be approximately equal to the peak-to-peak amplitude of the zero cross signal.

In FIG. 8, the correction signal generation unit 702 can measure the dynamic current (e.g., the variation in the current drawn because of switching one/off one or more components of the PLC modem unit) using a low impedance series resistor in the main processing path (e.g., a DC voltage path). As illustrated in the circuit of FIG. 8, in one example, operational amplifier (or op-amp) U1A 808 is used to differentially measure the voltage drop across a current sense resistor R8 (810) based, at least in part, on the zero cross signal (also referred to as an AC line cycle waveform) received at the input of the circuit 800. Specifically, as the circuit 800 draws current, a voltage drop is generated across the current sense resistor 810. As the amount of current drawn increases, the voltage drop generated across the current sense resistor 810 increases. The op-amp 808 is configured in a differential input operating mode across the current sense resistor 810. Therefore, the op-amp 808 senses the voltage drop (across the current sense resistor 810) that is proportional to the amount of current being drawn by the circuit 800. The op-amp 808 is also configured to amplify the differentially measured voltage drop. Furthermore, because the op-amp 808 is configured in an inverted amplifier configuration, the output of the op-amp 808 (after amplification) is the error correction signal 724 with voltage pulses that have the same amplitude but opposite polarity as the voltage drops of the input signal 802. It is noted that the amplification factor for the op-amp 808 can be selected so that the pulses in the correction signal 724 are approximately equal in amplitude but opposite in polarity to the voltage drops in the input signal 802. As depicted in the corresponding graph at the output of the op-amp 808, the correction signal 724 comprises two voltage pulses 818 and 820. The voltage pulses 818 and 820 are at the same position in time as the voltage drops 814 and 816. The voltage pulses 818 and 820 of the correction signal 724 have the same amplitude but opposite polarity as compared to the voltage drops 814 and 816 of the zero cross signal.

The summing unit sums the correction signal 724 at the output of the op-amp 808 with a sample of the input signal 802. It is noted that the sample of the input signal 802 includes the IR drop caused by the dynamic load (across resistors R9 and R13 of the summing unit 704). At the output of the summing unit, 704, the majority of the IR drop from the dynamic load (i.e., the voltage drops 814 and 816) is cancelled, as depicted by the graph 822 at the output of the summing unit 704. The resultant zero cross signal sample 822 (with little to no distortion) is provided to op-amp U1B 812 (that is part of the filtering unit 706 and the amplification unit 708). In one example of FIG. 8, the op-amp 812 is configured as a twin-T band-pass filter tuned to 55 Hz such that the AC line cycle frequencies between 50 and 60 Hz are filtered and amplified. In another example, the filtering unit 706 and the amplification unit 708 can comprise other suitable filtering and amplification mechanisms to remove small perturbations in the zero cross signal 822 after initial correction by the signal generation unit 702 and the summing unit 704. Thus, the combination of the cancellation unit of the op-amp 808 and the band-pass filtering unit of the op-amp 812 can help remove most or all of the interference and voltage transients from the dynamic loading in the input signal 802. The output 720 of the op-amp 812 (i.e., the filtering unit 706 and the amplification unit 708) can be a very large pure amplitude AC line cycle sinusoid ("corrected zero cross signal"). The corrected zero cross signal 720 can be provided as an input to the zero cross detector 112 (e.g., a detection comparator of the zero cross detector 112), which can be used to extract zero cross information for processing the PLC signal.

It is noted that, although FIG. 8 depicts the input signal 802 comprising a 12V nominal DC voltage, embodiments are not so limited. The nominal DC voltage level of the input signal 802 can depend on the power supply that powers the circuit 800. For example, if a 15V power supply is used to power the circuit 800, the input signal 802 would have a 15V nominal DC voltage level. Likewise, although FIG. 8 depicts the peak voltage of the superimposed zero cross signal as 100 mV, it is noted that the peak voltage of the zero cross signal may be at any suitable voltage level. It is also noted that although FIG. 8 depicts the voltage drops 814 and 816 at the negative peak and the positive peak of the input signal 802 respectively, embodiments are not so limited. The number, location, and width of the voltage drops in the input signal 802 can vary. For example, the voltage drops can occur during the positive cycle of the input signal 802, the negative cycle of the input signal 802, at the zero cross point of the input signal 802, etc. Furthermore, the voltage drops may be narrow, may span one cycle of the input signal 802, may span several cycles of the input signal 802, etc.

It is noted that in some implementations, the circuit 800 can be implemented in a system to automatically nullify the majority of the disruption from any dynamic load including RF power amplifiers, hard drives, etc., without prior knowledge of the components or their operating schedule. In some embodiments, the circuit 800 can be incorporated into embedded designs or can be connected using a separate circuit board of minimal size. In some embodiments, different components depicted in the circuit 800 may be implemented on-chip or off-chip. For example, the op-amps 808 and 812 may be implemented as part of the PLC modem unit while the other components (e.g., the resistors, capacitors, etc.) may be external to the PLC modem unit (e.g., as part of the power supply processing unit, on a separate circuit board, etc.). As another example, the resistors and the op-amps may be implemented as part of the PLC modem unit while the capacitors may be external to the PLC modem unit. It is noted that in addition to the examples described herein, various other implementations are possible. In some implementations, the circuit 800 can be part of an embedded solution supporting powerline communication in the external power supply with WLAN capabilities in the embedded device. It is noted, however, that although various examples have been described for implementing the error correction circuit 800 in the PLC system described above with reference to FIGS. 1-8, embodiments are not so limited. In other embodiments, the error correction circuit 800 can be implemented in various other types of systems (e.g., various other types of PLC systems) for reducing the signal distortion resulting from the dynamic loading effects on the AC line cycle waveform and providing a relatively clean and stable input AC line cycle waveform to one or more signal processing blocks of the system at the next signal processing stage. Furthermore, it should be noted that the circuit 800 is an example implementation of the correction signal generation unit 702, the summing unit 704, the filter unit 706, and the amplification unit 708. In other embodiments, one or more of the correction signal generation unit 702, the summing unit 704, the filter unit 706, and the amplification unit 708 can be implemented differently. For example, in some embodiments, the error correction unit 118 can be implemented as part of the zero cross detector 112.

Figure 9:
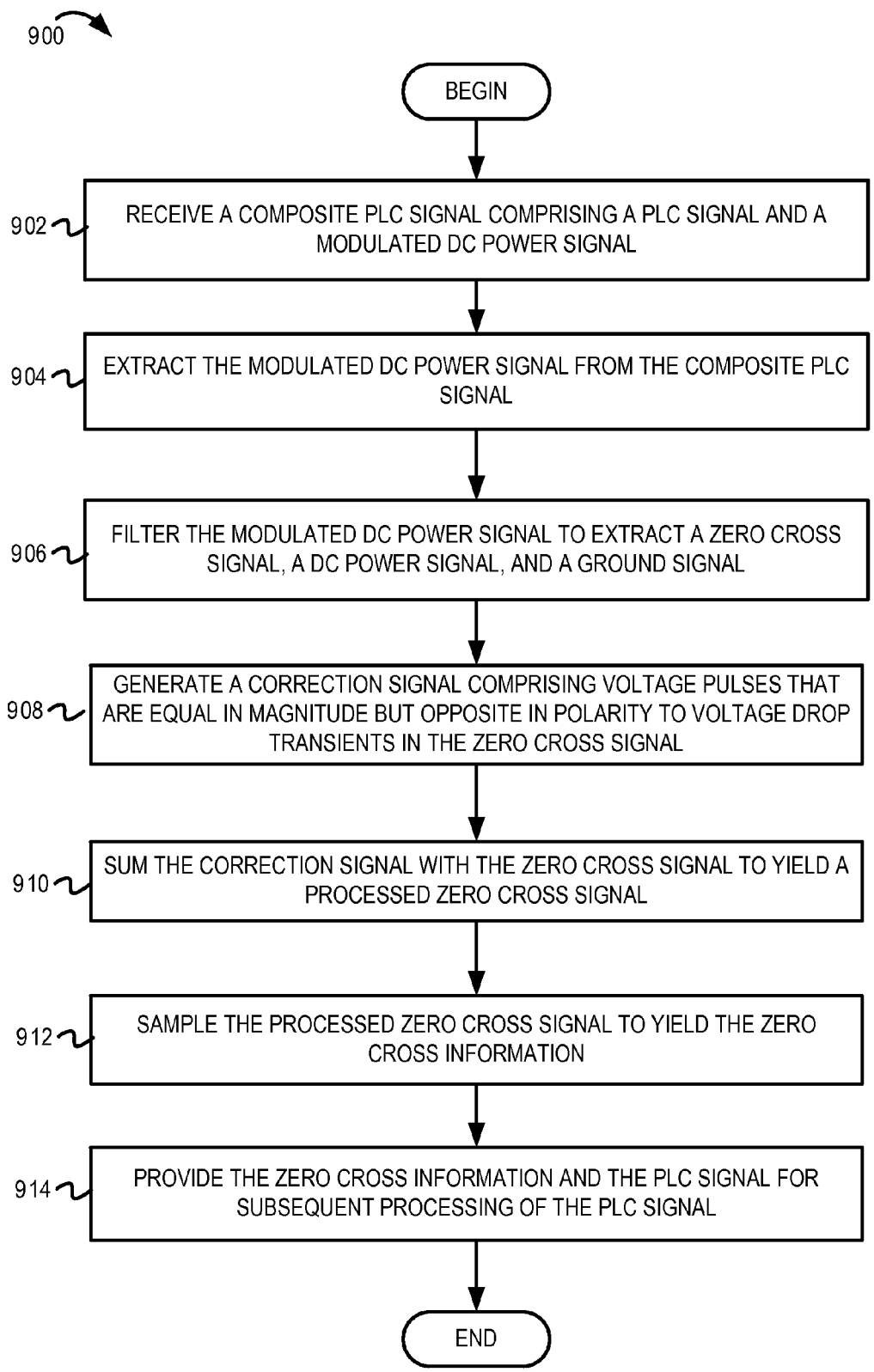
FIG. 9 is a flow diagram illustrating example operations for extracting zero cross information from a composite PLC signal.

FIG. 9 is a flow diagram 900 illustrating example operations for extracting zero cross information from a composite PLC signal. The flow begins at block 902.

At block 902, a composite PLC signal comprising a PLC signal and a modulated DC power signal is received. As described above with reference to FIG. 1, the PLC modem unit 110 can receive the modulated DC power signal comprising a zero cross signal (e.g., the zero cross signal modulated on the DC power signal), and a ground signal. The PLC signal can comprise data/control/management bits received via the powerline network at the power supply processing unit 102 (described above with reference to FIGS. 5-6). In one implementation, the biasing unit 114 of the PLC modem unit 110 can receive the composite PLC signal from the biasing unit 108 of the power supply processing unit 102. The flow continues at block 904.

At block 904, the modulated DC power signal is extracted from the composite PLC signal. For example, with reference to FIGS. 1-2, the biasing unit 114 can split the composite PLC signal to separate the modulated DC power signal and the ground signal from the PLC signal by passing the composite PLC signal through low pass filters and high pass filters, respectively. The biasing unit 114 can provide the PLC signal to the PLC transceiver unit 116 for subsequent processing of the PLC signal. The biasing unit 114 can provide the modulated DC power signal to the error correction unit 118. The flow continues at block 906.

At block 906, the modulated DC power signal is filtered to extract the zero cross signal, a DC power signal, and a ground signal. For example, the biasing unit 114 can provide the extracted modulated DC power signal and the ground signal to the error correction unit 118. The error correction unit 118 can extract the DC power signal and the ground signal and provide the DC power signal and the ground signal to at least the PLC transceiver unit 116. In some embodiments, as discussed above in FIG. 8, the error correction unit 118 can implement functionality to extract the DC power signal and the ground signal. As will be further discussed below, the error correction unit 118 can remove voltage transients from the zero cross signal to provide a clean and stable zero cross signal to the zero cross detector 112. The flow continues at block 908.

At block 908, a correction signal is generated comprising voltage pulses that are equal in magnitude but opposite in polarity to voltage drop transients in the zero cross signal. As discussed with reference to FIGS. 7 and 8, the correction signal generation unit 702 can generate a correction signal 724 that comprises voltage pulses 818 and 820 that are equal in magnitude but opposite in polarity as compared to voltage drops 814 and 816 in the zero cross signal. The flow continues at block 910.

At block 910, the correction signal is summed with the zero cross signal to yield a corrected zero cross signal. As discussed above with reference to FIGS. 7 and 8, the summing unit 704 can sum the zero cross signal with the correction signal 724. The resultant signal can be filtered (e.g., by the filter unit 706) and amplified (e.g., by the amplification unit 708) to yield the corrected zero cross signal 720. The error correction unit 118 can provide the corrected zero cross signal 720 to the zero cross detector 112 for extracting the zero cross information. The flow continues at block 912.

At block 912, the corrected zero cross signal is sampled to yield the zero cross information. For example, the zero cross detector 112 can sample the corrected zero cross signal 720 to yield the zero cross information. In one example, the zero cross detector 112 can comprise a zero cross demodulator for extracting the zero cross information from the corrected zero cross signal 720. In one example, the zero cross demodulator can comprise a comparator and a sampling unit. The zero cross demodulator can slice the corrected zero cross signal 720, and can generate a logic level zero cross sample or a sampled representation of the zero cross signal referred to herein as the zero cross information. The zero cross demodulator can generate the zero cross information that comprises a narrow pulse that coincides exactly with the zero voltage condition (e.g., that indicates when the AC powerline signal switched between a positive voltage level and a negative voltage level). The frequency of the zero cross information waveform is typically equal to the AC line frequency (e.g., 50 Hz or 60 Hz). The flow continues at block 914.

At block 914, the zero cross information and the PLC signal are provided for subsequent processing of the PLC signal. For example, the zero cross detector 112 can provide the zero cross information to the PLC transceiver unit 116. In addition, the PLC transceiver unit 116 can also receive the PLC signal (e.g., from the biasing unit 114), the DC power signal, and the ground signal. The PLC transceiver unit 116 can then process the PLC signal and can extract the information bits from the PLC signal based on the zero cross information. The PLC transceiver unit 116 can use the zero cross information to determine the timing and synchronization information, to determine appropriate time instants for sampling the PLC signal to enable proper demodulation, decoding, and detection of the PLC signal. From block 914, the flow ends.

It should be understood that FIGS. 1-9 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. For example, although the examples described herein describe a two-wire powerline communication power supply and modem interface mechanism coupling to an outlet, in other examples the powerline communication power supply and modem interface mechanism may include a three-wire power supply coupling to an outlet. The three-wire coupling may provide support for an additional channel provided by the ground connector, which may be used for providing control signaling, exploiting switch diversity or multiple-input multiple-output (MIMO) configurations. In this embodiment, the biasing unit 108 of the power supply processing unit 102 can provide the composite PLC signal to the biasing unit 114 of the PLC modem unit 110 via a three-wire cable. The connection interface 202 may be a three-pin plug and socket connection device that couples the power supply processing unit 102 to the PLC modem unit 110. In other embodiments, the powerline communication power supply and modem interface mechanism may include a multi-wire power supply coupling to an outlet and the connection interface 202 may be a multi-pin plug and socket connection device that couples the power supply processing unit 102 to the PLC modem unit 110.

It is noted that although the FIGS. 3-6 describe the zero cross signal 322 being coupled to the DC power signal 320 by summing the zero cross signal 322 with the DC output sample 320, embodiments are not so limited. In other embodiments, the zero cross signal 322 can be coupled to the DC power signal 320 by summing the zero cross signal 322 with the voltage reference 432. Furthermore, the modulation level or the percentage of the zero cross signal 322 that is coupled with the DC power signal 320 can also be varied (e.g., by increasing or decreasing the amplitude of the AC powerline sample). Lastly, although FIGS. 1-6 describe the power supply and zero cross generation unit and 104 generating the modulated DC power signal that is provided to the PLC modem unit 110, embodiments are not so limited. In other embodiments, the power supply and zero cross generation unit 104 can provide three distinct signals—the DC power signal, the zero cross signal, and the ground signal to the biasing unit 108. The biasing unit 108 can then provide the composite signal comprising the PLC signal, the DC power signal, the zero cross signal, and the ground signal to the PLC modem unit 110.

In some embodiments, some or all of the functionality of the error correction unit 118 can be implemented as part of the zero cross detector 112. For example, in some embodiments, the zero cross detector 112 can comprise a filter unit that extracts the zero cross signal from the modulated DC power signal and provides the zero cross signal (comprising the voltage drops) to the error correction unit 118. The error correction unit 118 can provide a zero cross signal (with little or no error) to the zero cross detector 112. In some embodiments, the error correction unit 118 can comprise the correction signal generation unit 702 and the summing unit 704. The output of the summing unit (e.g., the signal depicted in the graph 822 of FIG. 8) can be provided to the zero cross detector 112. The zero cross detector 112 can comprise a filtering unit and an amplification unit to remove/minimize any perturbations at the output of the summing unit 704. It is noted, however, that in other embodiments, the output of the summing unit 704 may not be filtered and/or amplified. Instead, the output of the summing unit 704 may be directly processed (e.g., by the zero cross detector 112) to extract the zero cross information.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
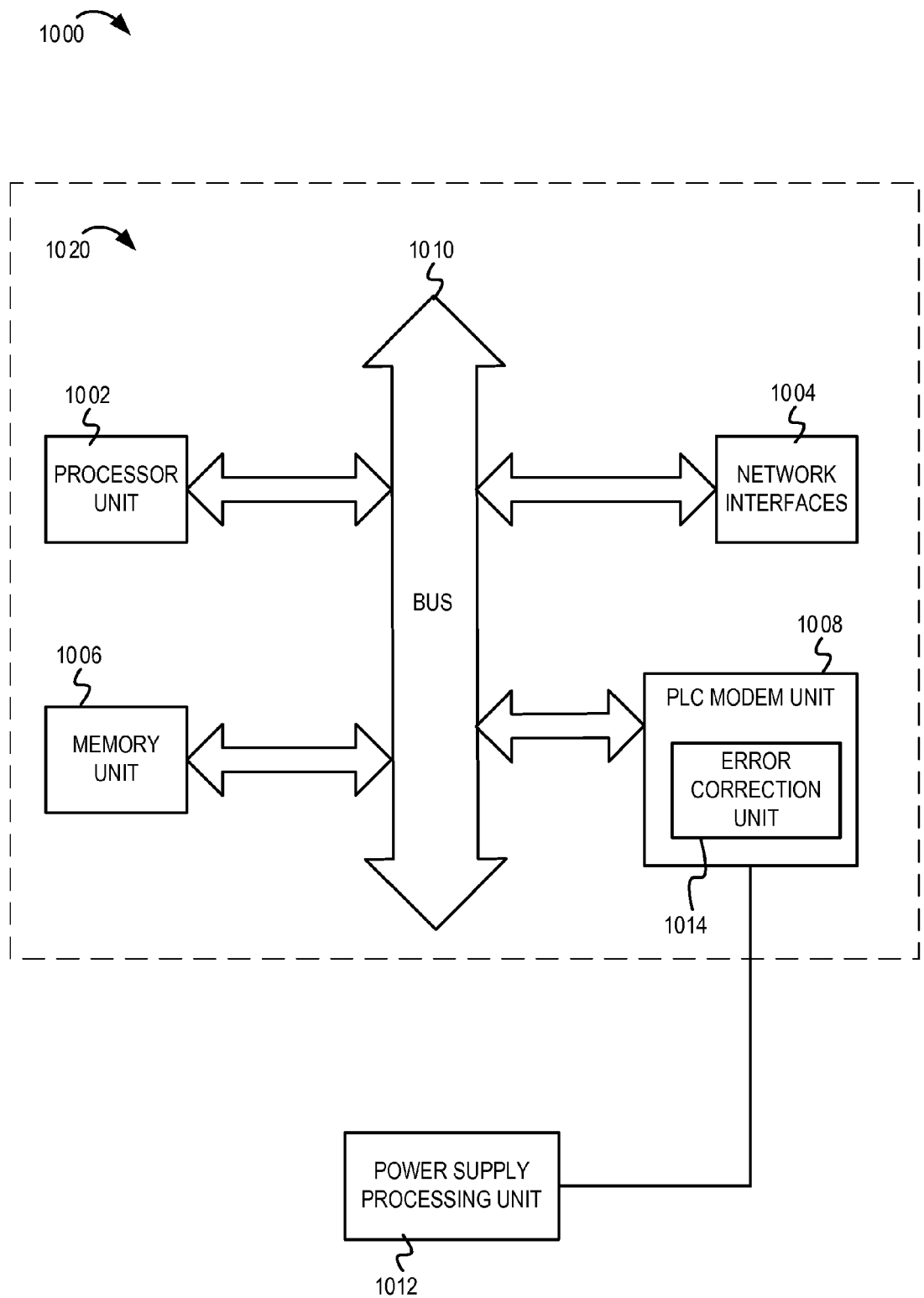
FIG. 10 is a block diagram of one embodiment of a system including a powerline communication power supply and modem interface that utilizes a two-wire connection for transmitting power, PLC signal and zero cross information.

FIG. 10 is a block diagram of one embodiment of a system 1000 including a powerline communication power supply and modem interface mechanism that utilizes a two-wire connection for transmitting power, PLC signal and zero cross information. The system 1000 comprises an electronic device 1020 that includes a PLC modem unit 1008, which is coupled to a power supply processing unit 1012. The PLC modem unit 1008 comprises an error correction unit 1014. In some implementations, as depicted in FIG. 10, the PLC modem unit 1008 can be included within one of a personal computer (PC), a netbook, a notebook computer, a tablet computer, a gaming console, a mobile phone, a smart appliance, or other electronic devices 1020 configured for powerline communication. The power supply processing unit 1012 can be included in a power supply adapter (e.g., a laptop power block/adapter) or a wall module that is externally coupled with the electronic device 1020. In some implementations, the PLC modem unit 1008 and the power supply processing unit 1012 can both be included within the electronic device configured for powerline communication. In other implementations, the PLC modem unit 1008 and the power supply processing unit 1012 can be embodied on distinct integrated circuits on a common circuit board (or on separate circuit boards that are externally coupled together). The power supply processing unit 1012 implements functionality to generate a zero cross signal, a DC power signal, and a ground signal from an input AC powerline signal (comprising a PLC signal and an AC power supply signal). The power supply processing unit 1012 can also combine the generated zero cross signal, the DC power signal, and the ground signal with the PLC signal to generate a composite PLC signal, as described above with reference to FIGS. 1-6. The power supply processing unit 1012 can provide the composite PLC signal to the PLC modem unit 1008. The error correction unit 1014 of the PLC modem unit 1008 implements functionality to extract the zero cross information from the composite PLC signal, remove voltage transients in the zero cross signal, and to generate a relatively error free corrected zero cross signal, as described above with reference to FIGS. 7-9. The PLC modem unit 1008 implements functionality to determine zero cross information from the corrected zero cross signal and to use the zero cross information for subsequent processing of the PLC signal, as described above with reference to FIGS. 1-2 and 9.

The electronic device 1000 also includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 1000 also includes a bus 1010 (e.g., PCI, ISA, PCI-Express, HyperTransport®, InfiniBand®, NuBus, AHB, AXI, etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.). Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the memory unit 1006, and the network interfaces 1006 are coupled to the bus 1010. Although illustrated as being coupled to the bus 1010, the memory unit 1006 may be coupled to the processor unit 1002. For example, in addition to the processor unit 1002 coupled with the bus 1010, the PLC modem unit 1008 and/or the power supply processing unit 1012 may comprise at least one additional processor unit.

While the embodiments are described with reference to various implementations and exploitations, it will be understood that these embodiments are illustrative and that the scope of the inventive subject matter is not limited to them. In general, an error correction mechanism for a powerline communication power supply and modem interface as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A powerline communication (PLC) device comprising:
   an error correction unit configured to:
      receive an input AC line cycle signal and a voltage drop superimposed on the input AC line cycle signal;
      generate an initial correction signal comprising the voltage drop based, at least in part, on the input AC line cycle signal;
      generate an error correction signal that comprises a voltage pulse that corresponds to the voltage drop based, at least in part, on the initial correction signal; and
      generate a corrected AC line cycle signal based, at least in part, on the error correction signal and a sample of the input AC line cycle signal.

2. The PLC device of claim 1, further comprising a zero cross detector configured to extract an AC zero cross signal from the corrected AC line cycle signal.

3. The PLC device of claim 1, wherein the error correction unit comprises an operational amplifier configured to generate the error correction signal.

4. The PLC device of claim 3, wherein the operational amplifier is configured in a differential input mode and an inverted amplifier output mode.

5. The PLC device of claim 1, wherein the voltage drop superimposed on the input AC line cycle signal represents signal distortion from dynamic loading effects associated with the input AC line cycle signal.

6. The PLC device of claim 1, wherein,
   an amplitude of the voltage pulse of the error correction signal approximately equals an amplitude of the corresponding voltage drop of the input AC line cycle signal, and a polarity of the voltage pulse of the error correction signal is opposite to a polarity of the corresponding voltage drop of the input AC line cycle signal.

7. The PLC device of claim 1, wherein the error correction unit comprises a summing unit configured to combine the error correction signal with the sample of the input AC line cycle signal to minimize an amplitude of the voltage drop.

8. The PLC device of claim 1, further comprising an operational amplifier configured to operate as a band pass filter and an amplifier, wherein the operational amplifier generates the corrected AC line cycle signal.

9. A powerline modem comprising:
   a biasing unit configured to:
      extract a powerline communication (PLC) signal from a composite PLC signal received at the powerline modem, and
      extract a DC power signal modulated with an AC zero cross signal from the composite PLC signal;
   an error correction unit configured to:
      process the AC zero cross signal to reduce signal distortion associated with the powerline modem; and
   a zero cross detector configured to:
      receive the processed AC zero cross signal from the error correction unit, and
      extract zero cross information from the processed AC zero cross signal.

10. The powerline modem of claim 9, wherein the error correction unit is further configured to:
    generate an error correction signal from the AC zero cross signal; and
    generate the processed AC zero cross signal based, at least in part, on the error correction signal and a sample of the AC zero cross signal.

11. The powerline modem of claim 9, wherein the error correction unit is further configured to:
    generate an initial correction signal comprising a voltage drop superimposed on the AC zero cross signal, wherein the voltage drop is representative of the signal distortion from dynamic loading effects associated with the powerline modem; and
    generate an error correction signal based, at least in part, on the initial correction signal.

12. The powerline modem of claim 11, wherein the error correction signal comprises a voltage pulse that corresponds to the voltage drop superimposed on the AC zero cross signal, an amplitude of the voltage pulse of the error correction signal approximately equals an amplitude of the corresponding voltage drop of the AC zero cross signal, and a polarity of the voltage pulse of the error correction signal is opposite to a polarity of the corresponding voltage drop of the AC zero cross signal.

13. The powerline modem of claim 9, wherein the zero cross detector is further configured to:
    generate the zero cross information representing timing of zero crossings of the composite PLC signal based, at least in part, on sampling the processed AC zero cross signal.

14. An apparatus comprising:
    a power supply processing unit configured to:
       generate a DC power signal from an AC powerline signal received from a powerline communication (PLC) network;
       determine an AC zero cross signal associated with the AC powerline signal;
       determine a modulated DC power signal by modulating the AC zero cross signal onto the DC power signal;
       extract a PLC signal from the AC powerline signal;

generate a composite PLC signal comprising the PLC signal and the modulated DC power signal; and
a powerline modem configured to:
extract the PLC signal and the modulated DC power signal from the composite PLC signal received from the power supply processing unit;
extract the AC zero cross signal from the modulated DC power signal;
process the AC zero cross signal to reduce signal distortion associated with the powerline modem; and
process the PLC signal based, at least in part, on zero cross information determined from the processed AC zero cross signal.

15. The apparatus of claim 14, wherein the power supply processing unit is coupled to the powerline modem via a two-wire connector.

16. The apparatus of claim 14, wherein the power supply processing unit is coupled to the powerline modem via a multi-wire connector.

17. The apparatus of claim 14, wherein the power supply processing unit comprises:
a rectifier configured to generate a rectified signal comprising a DC power component and a superimposed AC ripple component;
a transformer configured to generate a low voltage rectified signal by stepping down the rectified signal; and
a filter configured to generate the DC power signal and minimize the superimposed AC ripple component by filtering the low voltage rectified signal.

18. The apparatus of claim 17, wherein the power supply processing unit further comprises:
a powerline sampling unit configured to generate the AC zero cross signal based, at least in part, on a sample of the AC powerline signal.

19. The apparatus of claim 18, wherein the power supply processing unit further comprises:
an output sampling unit configured to provide a sample of the modulated DC power signal as feedback to a summing unit of the power supply processing unit;
the summing unit configured to generate a feedback signal based, at least in part, on the AC zero cross signal received from the powerline sampling unit and the sample of the modulated DC power signal; and
a voltage regulator configured to:
maintain stability of the DC power signal based, at least in part, on the feedback signal; and
couple the feedback signal with the rectified signal to modulate the AC zero cross signal onto the DC power signal.

20. The apparatus of claim 19, wherein the voltage regulator comprises:
a switch mode controller configured to:
generate an error signal based, at least in part, on a difference between the sample of the DC power signal and a threshold DC signal;
generate a switching waveform based, at least in part, on the error signal; and
apply the switching waveform to a switching device associated with the power supply processing unit to control an amplitude of DC power signal.

21. The apparatus of claim 20, wherein the switch mode controller comprises a comparator coupled with a pulse width modulator,
wherein the switch mode controller is configured to:
receive the sample of the DC power signal and the AC zero cross signal from the output sampling unit;
compare the sample of the DC power signal against the threshold DC signal;
generate the error signal at a first voltage level in response to determining that the DC power signal exceeds the threshold DC signal;
generate the error signal at a second voltage level in response to determining that the DC power signal is at or below the threshold DC signal; and
provide the error signal to the pulse width modulator; and
wherein the pulse width modulator is configured to:
generate the switching waveform based, at least in part, on the error signal; and
apply the switching waveform to the switching device to control the amplitude of DC power signal.

22. The apparatus of claim 14, wherein the power supply processing unit comprises a biasing unit configured to:
generate the composite PLC signal by coupling the PLC signal with the modulated DC power signal; and
provide the composite PLC signal to a corresponding biasing unit associated with the powerline modem.

23. The apparatus of claim 14, wherein the powerline modem comprises a biasing unit configured to generate the PLC signal by removing the modulated DC power signal from the composite PLC signal.

24. The apparatus of claim 14, wherein the powerline modem further comprises:
an error correction unit configured to:
generate an error correction signal comprising a voltage pulse that corresponds to a voltage drop superimposed on the AC zero cross signal; and
generate the processed AC zero cross signal with reduced signal distortion based, at least in part, on filtering and amplifying a combination of the error correction signal and a sample of the AC zero cross signal.

25. The apparatus of claim 24, wherein an amplitude of the voltage pulse of the error correction signal approximately equals an amplitude of the corresponding voltage drop of the AC zero cross signal, and a polarity of the voltage pulse of the error correction signal is opposite to a polarity of the corresponding voltage drop of the AC zero cross signal.

26. The apparatus of claim 14, wherein the powerline modem further comprises a zero cross detector configured to:
determine the zero cross information that is representative of timing of zero crossings of the AC powerline signal by sampling the processed AC zero cross signal.

27. A method comprising:
receiving, at a powerline communication (PLC) device via a PLC network, an input AC line cycle signal and a voltage drop superimposed on the input AC line cycle signal;
generating an initial correction signal comprising the voltage drop based, at least in part, on the input AC line cycle signal;
generating an error correction signal that comprises a voltage pulse that corresponds to the voltage drop based, at least in part, on the initial correction signal; and
generating a corrected AC line cycle signal based, at least in part, on the error correction signal and a sample of the input AC line cycle signal.

28. The method of claim 27, further comprising extracting zero cross information associated with the input AC line cycle signal from the corrected AC line cycle signal.

29. The method of claim 27, wherein
an amplitude of the voltage pulse of the error correction signal approximately equals an amplitude of the corresponding voltage drop of the input AC line cycle signal, and a polarity of the voltage pulse of the error correction signal is opposite to a polarity of the corresponding voltage drop of the input AC line cycle signal.

30. The method of claim 27, further comprising summing the error correction signal with the sample of the input AC line cycle signal to minimize an amplitude of the voltage drop.

* * * * *